(12) United States Patent
Maekawa et al.

(10) Patent No.: US 10,876,485 B2
(45) Date of Patent: Dec. 29, 2020

(54) ENGINE CONTROL DEVICE

(71) Applicant: Mazda Motor Corporation, Hiroshima (JP)

(72) Inventors: Kota Maekawa, Hiroshima (JP); Takeatsu Ito, Hiroshima (JP); Kouji Miyamoto, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/590,616

(22) Filed: Oct. 2, 2019

(65) Prior Publication Data
US 2020/0141344 A1 May 7, 2020

(30) Foreign Application Priority Data
Nov. 1, 2018 (JP) .................................. 2018-206285

(51) Int. Cl.
*F02D 41/14* (2006.01)
*F01N 13/00* (2010.01)
(Continued)

(52) U.S. Cl.
CPC ....... *F02D 41/1461* (2013.01); *F01N 13/008* (2013.01); *F02D 41/1439* (2013.01);
(Continued)

(58) Field of Classification Search
CPC ............. F02D 41/1463; F02D 41/1456; F02D 41/1461; F02D 41/1439; F02D 41/40;
(Continued)

(56) References Cited

U.S. PATENT DOCUMENTS

2016/0115880 A1* 4/2016 Kondo .................... F02P 5/045
 123/406.55
2017/0145965 A1* 5/2017 Singh .................... F01N 13/008
(Continued)

FOREIGN PATENT DOCUMENTS

JP H10068346 A 3/1998

*Primary Examiner* — George C Jin
(74) *Attorney, Agent, or Firm* — Alleman Hall Creasman & Tuttle LLP

(57) ABSTRACT

An engine control device is provided, which includes an ignition plug configured to ignite mixture gas inside a cylinder of the engine, an injector configured to change an air-fuel ratio inside the cylinder, a $NO_x$ sensor, and a controller including a processor. The controller performs a first control to control the ignition plug so that ignition is performed at a basic ignition timing or an ignition timing after the basic timing is corrected based on a combustion state of the mixture gas, and a second control to control the injector so that a $NO_x$ concentration approaches a given target value. When the ignition timing is corrected by the first control to a retarding side, the controller suspends a correction to a richer side even if the $NO_x$ concentration is a concentration at which the air-fuel ratio is corrected to the richer side by the second control.

10 Claims, 14 Drawing Sheets

(51) Int. Cl.
*F02D 41/40* (2006.01)
*F02P 5/04* (2006.01)
*F02P 5/15* (2006.01)
*F02P 5/153* (2006.01)

(52) U.S. Cl.
CPC .............. *F02D 41/40* (2013.01); *F02P 5/045* (2013.01); *F02P 5/153* (2013.01); *F02P 5/1516* (2013.01); *F02D 2200/021* (2013.01)

(58) Field of Classification Search
CPC .............. F02D 41/3041; F02D 41/006; F02D 2200/021; F02D 35/026; F02N 13/008; F02P 5/045; F02P 5/1516; F02P 5/153
See application file for complete search history.

(56) References Cited

U.S. PATENT DOCUMENTS

| | | | |
|---|---|---|---|
| 2018/0017003 A1* | 1/2018 | Yamaguchi | F02D 41/405 |
| 2018/0135541 A1* | 5/2018 | Hsieh | F02D 41/18 |
| 2019/0048842 A1* | 2/2019 | Oryoji | F02M 26/06 |
| 2020/0141344 A1* | 5/2020 | Maekawa | F02D 41/1461 |

* cited by examiner

ENGINE CONTROL DEVICE

TECHNICAL FIELD

The present disclosure relates to a control device for an engine provided with an engine body where a cylinder is formed, an exhaust passage through which exhaust gas discharged from the engine body passes, and a three-way catalyst provided to the exhaust passage.

BACKGROUND OF THE DISCLOSURE

Conventionally, a three-way catalyst is provided to an exhaust passage of an engine, and exhaust gas is purified by the three-way catalyst. In detail, the three-way catalyst is capable of purifying CO, HC, and $NO_x$ simultaneously when the air-fuel ratio of exhaust gas passing through the catalyst is near a stoichiometric air-fuel ratio. The three-way catalyst is provided to the exhaust passage and the air-fuel ratio of exhaust gas is controlled to be near the stoichiometric air-fuel ratio to purify CO, HC, and $NO_x$ simultaneously.

For example, JP1998-068346A discloses an engine which includes a three-way catalyst, an oxygen sensor, and a $NO_x$ sensor which are provided to an exhaust passage. The oxygen sensor is capable of detecting an air-fuel ratio of exhaust gas, and the $NO_x$ sensor is capable of detecting a concentration of $NO_x$ in the exhaust gas. The $NO_x$ sensor is disposed at a location in the exhaust passage downstream of the three-way catalyst. This engine corrects the air-fuel ratio inside a cylinder based on an output value of the $NO_x$ sensor so that the air-fuel ratio of exhaust gas which flows into the three-way catalyst becomes a stoichiometric air-fuel ratio.

Like the engine disclosed in JP1998-068346A, if the air-fuel ratio inside the cylinder is controlled based on the detection value of the $NO_x$ sensor, it is thought that the air-fuel ratio inside the cylinder can suitably be controlled to an air-fuel ratio at which the discharging amount of $NO_x$ becomes a desired amount. However, if the air-fuel ratio is controlled simply based on the detection value of the $NO_x$ sensor, the air-fuel ratio is changed also when the discharging amount of $NO_x$ is changed due to factors other than the air-fuel ratio. Therefore, there is a possibility that the combustion state inside the cylinder, i.e., the engine performance deviates from an appropriate range.

SUMMARY OF THE DISCLOSURE

The present disclosure is made in view of the above situations, and one purpose thereof is to provide a control device for an engine, capable of appropriately controlling a discharging amount of $NO_x$ and obtaining a suitable engine performance.

According to one aspect of the present disclosure, a control device for an engine provided with an engine body where a cylinder is formed, and an exhaust passage through which exhaust gas discharged from the engine body circulates, is provided. The control device includes an ignition plug configured to ignite a mixture gas inside the cylinder, an injector configured to change an air-fuel ratio inside the cylinder, a $NO_x$ sensor disposed in the exhaust passage and configured to detect a concentration of $NO_x$ in the exhaust gas, and a controller including a processor configured to control the ignition plug and the injector. The controller performs a first control and a second control. In the first control, the ignition plug is controlled so that ignition is performed at one of a preset basic ignition timing, and an ignition timing after the basic ignition timing is corrected based on a combustion state of the mixture gas inside the cylinder. In the second control, the injector is controlled so that the $NO_x$ concentration detected by the $NO_x$ sensor fapproaches a given target value. When the ignition timing is corrected by the first control to a retarding side of the basic ignition timing, the controller suspends a correction of the air-fuel ratio inside the cylinder to a richer side even if the $NO_x$ concentration detected by the $NO_x$ sensor is a concentration at which the correction of the air-fuel ratio to the richer side is performed by the second control.

According to this configuration, the air-fuel ratio inside the cylinder is changed based on the detection value of the $NO_x$ sensor, i.e., the actual $NO_x$ concentration of exhaust gas detected by the $NO_x$ sensor. Therefore, the amount of $NO_x$ discharged from the engine can be made a suitable amount by making the air-fuel ratio inside the cylinder to the air-fuel ratio at which the $NO_x$ concentration of the exhaust gas becomes the desired concentration. Further, since the ignition timing is corrected based on the combustion state of the mixture gas inside the cylinder, the combustion state of the mixture gas can be made a suitable state so that combustion noise is prevented from being increased and the combustion can be avoided from being unstable. For example, in a combustion state where combustion noise tends to worsen, the ignition timing is retarded to prevent the worsening of combustion noise. Further, in a combustion state where the combustion tends to become unstable, the ignition timing is advanced to stabilize the combustion.

However, when the control of the air-fuel ratio and the control of the ignition timing are simply performed, there is a possibility that the combustion state is not stably maintained and fuel efficiency degrades. In detail, when the ignition timing is changed to the retarding side in order to slow the combustion of the mixture gas based on the combustion state of the mixture gas, the combustion temperature drops, resulting in reduction of the amount of $NO_x$ generated inside the cylinder and the $NO_x$ concentration of the exhaust gas. When the $NO_x$ concentration of the exhaust gas drops below the target value accordingly, the air-fuel ratio is controlled to be corrected to the side in which the $NO_x$ concentration increases, i.e., to the lower side (richer side). When the air-fuel ratio is corrected to the richer side (lower side), fuel efficiency degrades. Further, when the air-fuel ratio is lowered, the combustion is stimulated. Thus, there is a possibility that the combustion state cannot suitably be maintained because the combustion may be stimulated by the air-fuel ratio being lowered even though the ignition timing is corrected to the retarding side in order to slow the combustion.

On the other hand, according to this configuration, when the ignition timing is corrected to the retarding timing, the correction of the air-fuel ratio to the richer side is suspended even if the $NO_x$ concentration of the exhaust gas is the concentration at which the air-fuel ratio is to be corrected to the richer side. Therefore, the degradation of fuel efficiency can be prevented while making the discharging amount of $NO_x$ to the suitable amount and making the combustion state of the mixture gas to the suitable state as described above. Note that the suspension of the correction used herein is to suspend the correction of the air-fuel ratio to the richer side, and if the air-fuel ratio has already been corrected, the correction is maintained. That is, the suspension of the correction means to discontinue the correction and suspend an update of the correcting amount.

When the ignition timing is corrected to an advancing side of the basic ignition timing by the first control, the controller may suspend a correction of the air-fuel ratio inside the cylinder to a leaner side even if the $NO_x$ concentration detected by the $NO_x$ sensor is a concentration at which the correction of the air-fuel ratio to the leaner side is performed by the second control.

According to this configuration, the air-fuel ratio can be prevented from being corrected to the leaner side (higher side), i.e., to the side in which the combustion of the mixture gas slows, based on the $NO_x$ concentration, even though the ignition timing is changed to the advancing side based on the combustion state of the mixture gas in order to stimulate the combustion of the mixture gas. Therefore, the combustion state can suitably be maintained more reliably.

When the controller suspends the correction of the air-fuel ratio inside the cylinder to the richer side, the controller may maintain the air-fuel ratio at a most recent target air-fuel ratio.

The controller may perform partial compression ignition combustion in which spark ignition (SI) combustion of a portion of the mixture gas inside the cylinder is forcibly carried out by jump-spark ignition and compression ignition (CI) combustion of the remaining mixture gas inside the cylinder is then carried out by self-ignition. Further, the controller may perform the second control in at least a part of an operating range where the partial compression ignition combustion is performed.

According to this configuration, in at least a part of the operating range, by controlling the air-fuel ratio and the ignition timing, the degradation of fuel efficiency can be prevented as described above while making the amount of $NO_x$ discharged from the engine to the suitable amount, and realizing the suitable partial compression ignition combustion.

The control device may include an in-cylinder pressure sensor configured to detect an in-cylinder pressure inside a combustion chamber of the engine. The basic ignition timing may be set based on an operating state of the engine. A combustion center-of-gravity timing that is a timing at which a heat generation of 50% of the total amount of a calorific power inside the cylinder occurs may be set as a target combustion center-of-gravity timing. A rate of heat release may be calculated based on the in-cylinder pressure detected by the in-cylinder pressure sensor, and the total amount of heat release per one combustion cycle may be calculated by integrating the calculated rates of heat release for one combustion cycle. The timing at which an amount of heat release reaches 50% of the calculated total amount of heat release may be calculated as an actual combustion center-of-gravity timing. The basic ignition timing may be corrected based on a difference between the target combustion center-of-gravity timing and the actual combustion center-of-gravity timing. The target combustion center-of-gravity timing may be corrected to a retarding side when combustion noise increases.

The target combustion center-of-gravity timing may be corrected to the retarding side when an exhaust gas recirculation (EGR) rate is higher than a preset value.

The target combustion center-of-gravity timing may be corrected to the retarding side when a water temperature of the engine is higher than a preset value.

The target combustion center-of-gravity timing may be corrected to the retarding side when the in-cylinder pressure is higher than a preset value.

The controller may control the injector to increase an amount of change in the air-fuel ratio inside the cylinder as the difference between the $NO_x$ concentration detected by the $NO_x$ sensor and the target value becomes larger.

According to this configuration, the $NO_x$ concentration can securely be made the target value in an early stage.

According to another aspect of the present disclosure, a method of controlling an engine is provided. The method includes the steps of performing a first control in which ignition is performed at one of a preset basic ignition timing, and an ignition timing after the basic ignition timing is corrected based on a combustion state of the mixture gas inside a cylinder formed in an engine body of the engine, and a second control in which a concentration of $NO_x$ approaches a given target value, and when the ignition timing is corrected by the first control to a retarding side of the basic ignition timing, suspending a correction of the air-fuel ratio inside the cylinder to a richer side even if the $NO_x$ concentration is a concentration at which the correction of the air-fuel ratio to the richer side is performed by the second control.

DETAILED DESCRIPTION OF THE DISCLOSURE (1) Entire Configuration of Engine

Figure 1:
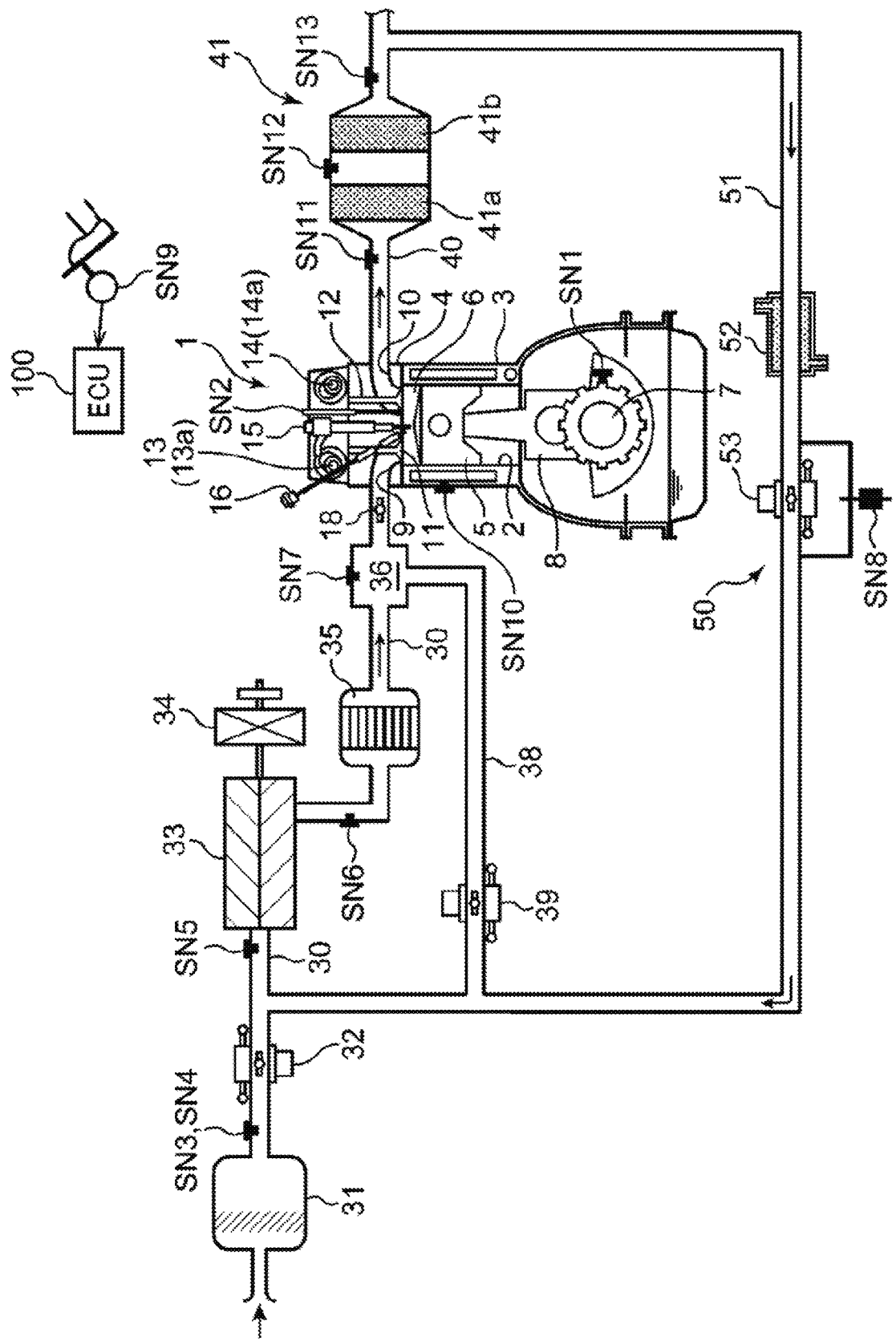
FIG. 1 is a system diagram schematically illustrating an entire configuration of an engine according to one embodiment of the present disclosure.

FIG. 1 is a view illustrating a desirable embodiment of an engine to which an air-fuel ratio control device of the present disclosure is applied. The engine illustrated in this figure is a direct-injection gasoline engine of four cycles, which is mounted on a vehicle as a power source for propelling the vehicle. The engine includes an engine body 1, an intake passage 30 through which intake air introduced into the engine body 1 flows, an exhaust passage 40 through which exhaust gas discharged from the engine body 1 flows, and an exhaust gas recirculation (EGR) device 50 which recirculates a part of exhaust gas which circulates in the exhaust passage 40 back to the intake passage 30.

The engine body 1 includes a cylinder block 3 where cylinders 2 are formed, a cylinder head 4 attached to an upper surface of the cylinder block 3 so as to cover the cylinders 2 from above, and pistons 5 respectively inserted into the cylinders 2 so as to be reciprocatable. Although the engine body 1 is typically a multicylinder engine having a plurality of cylinders (for example, four cylinders lined up in a direction perpendicular to the drawing sheet of FIG. 1), only one cylinder 2 will be described herein for simplifying the description.

A combustion chamber 6 is defined above the piston 5, and fuel of which a main component is gasoline is supplied to the combustion chamber 6 by an injection from an injector 15 (described later). Then, the supplied fuel combusts while being mixed with air inside the combustion chamber 6, and the piston 5 pushed downwardly by an expanding force generated by the combustion reciprocates in the vertical direction. The fuel may contain a subcomponent, such as bioethanol, in addition to gasoline. Hereinafter, an amount of fuel injected from the injector 15 is simply referred to as the "injection amount."

Below the piston 5, a crankshaft 7 which is an output shaft of the engine body 1 is provided. The crankshaft 7 is coupled to the piston 5 through a connecting rod 8, and is rotated about a center axis thereof according to the reciprocating motion (up-and-down motion) of the piston 5.

A geometric compression ratio of the cylinder 2, i.e., a ratio between the volume of the combustion chamber 6 when the piston 5 is at a top dead center and the volume of the combustion chamber 6 when the piston 5 is at a bottom dead center, is set as 13:1 or larger and 30:1 or smaller, as a suitable ratio for SPCCI combustion (partial compression ignition combustion) described later. In more detail, the geometric compression ratio of the cylinder 2 is desirably set 14:1 or larger and 17:1 or smaller in the case of a regular gasoline specification in which gasoline fuel of which the octane number is about 91 is used, and set 15:1 or larger and 18:1 or smaller in the case of a high-octane gasoline specification in which gasoline fuel of which the octane number is about 96 is used.

The cylinder block 3 is provided with a crank angle sensor SN1 which detects a rotation angle of the crankshaft 7 (crank angle) and a rotation speed (engine speed) of the crankshaft 7. In addition, the cylinder block 3 is provided with a water temperature sensor SN10 which detects a water temperature of the engine which is a temperature of coolant flowing inside the cylinder block 3.

The cylinder head 4 is provided with an intake port 9 and an exhaust port 10 which open in the combustion chamber 6, an intake valve 11 which opens and closes the intake port 9, and an exhaust valve 12 which opens and closes the exhaust port 10. Note that a valve configuration of the engine of this embodiment is four valve type comprised of two intake valves and two exhaust valves, and therefore, two intake ports 9, two exhaust ports 10, two intake valves 11, and two exhaust valves 12 are provided to each cylinder 2. In this embodiment, a swirl valve 18 which can be opened and closed is provided to one of the two intake ports 9 connected to one cylinder 2 to change the strength of a swirl flow inside the cylinder 2 (a swiveling flow which circles about a cylinder axis).

The intake valve 11 and the exhaust valve 12 are opened and closed by valve operating mechanisms 13 and 14 including a pair of cam shafts disposed in the cylinder head 4 so that the valves are interlocked with the rotation of the crankshaft 7.

An intake VVT 13a which can change at least an open timing of the intake valve 11 is built in the valve operating mechanism 13 for intake valve 11. Similarly, an exhaust VVT 14a which can change at least a close timing of the exhaust valve 12 is built in the valve operating mechanism 14 for the exhaust valve 12. By the control of the intake VVT 13a and the exhaust VVT 14a, in this embodiment, it is possible to adjust a valve overlap period during which both the intake valve 11 and the exhaust valve 12 open through an exhaust top dead center, and by this adjustment of the valve overlap period, it is possible to adjust an amount of burnt gas which remains inside the combustion chamber 6 (internal EGR gas). Note that the intake VVT 13a (exhaust VVT 14a) may be a variable mechanism of a type in which only the close timing (open timing) of the intake valve 11 (exhaust valve 12) is changed while the open timing (close timing) is fixed, or may be a variable mechanism of a phase type in which the open timing and the close timing of the intake valve 11 (exhaust valve 12) are changed simultaneously.

The cylinder head 4 is provided with the injector 15 which injects fuel (mainly gasoline) into the combustion chamber 6, and an ignition plug 16 which ignites a mixture gas comprised of the fuel injected into the combustion chamber 6 from the injector 15 and air introduced into the combustion chamber 6. The cylinder head 4 is further provided with an in-cylinder pressure sensor SN2 which detects an in-cylinder pressure which is a pressure inside the combustion chamber 6. This ignition plug 16 is one example of an "ignitor."

The injector 15 is a multiple nozzle hole injector in which a plurality of nozzle holes are formed in a tip end thereof, and capable of injecting fuel radially from the plurality of nozzle holes. The injector 15 is provided so that the tip end thereof opposes to a central part of a crown surface of the piston 5. Note that although illustration is omitted, in this embodiment, a cavity is formed in the crown surface of the piston 5 so that a comparatively large area including the central part of the crown surface is dented to the opposite side (downwardly) from the cylinder head 4.

The ignition plug 16 is disposed at a position offset slightly to the air intake side from the injector 15.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with an air cleaner 31 which removes the foreign substance under air intake, a throttle valve 32 which can be opened and closed to adjust a flow rate of intake air, a supercharger 33 which sends out intake air while compressing the air, an intercooler 35 which cools the intake air compressed by the supercharger 33, and a surge tank 36, in this order from the upstream.

Corresponding parts of the intake passage 30 are provided with an airflow sensor SN3 which detects a flow rate of intake air, first and second intake air temperature sensors SN4 and SN6 each of which detects a temperature of intake air, and first and second intake pressure sensors SN5 and SN7 each of which detects a pressure of intake air. The airflow sensor SN3 and the first intake air temperature sensor SN4 are provided to a portion of the intake passage 30 between the air cleaner 31 and the throttle valve 32, and detect a flow rate and a temperature of the intake air which passes through this portion, respectively. The first intake pressure sensor SN5 is provided to a portion of the intake passage 30 between the throttle valve 32 and the supercharger 33 (downstream of a connection port of an EGR passage 51 described later), and detects a pressure of intake air which passes through this portion. The second intake air temperature sensor SN6 is provided to a portion of the intake passage 30 between the supercharger 33 and the intercooler 35, and detects a temperature of intake air which passes through this portion. The second intake pressure sensor SN7 is provided to the surge tank 36, and detects a pressure of intake air inside the surge tank 36.

The supercharger 33 is a mechanical supercharger which is mechanically linked with the engine body 1. Although the supercharger 33 is not limited to a particular type, any known supercharger, such as Lysholm, Root, or centrifugal type supercharger, can be used as the supercharger 33. Between the supercharger 33 and the engine body 1, an electromagnetic clutch 34 which can electrically switch between "connect (engage)" and "disconnect (disengage)" is provided. When the electromagnetic clutch 34 is connected, a driving force is transmitted from the engine body 1 to the supercharger 33, and the supercharger 33 performs a boost. On the other hand, when the electromagnetic clutch 34 is disconnected, the transfer of the driving force is intercepted, and thereby the boost by the supercharger 33 is suspended.

A bypass passage 38 for bypassing the supercharger 33 is provided to the intake passage 30. The bypass passage 38 mutually connects the surge tank 36 and the EGR passage 51 (described later). A by-pass valve 39 which can be opened and closed is provided to the bypass passage 38. The by-pass valve 39 is a valve for adjusting, the pressure, i.e., the boost pressure, of intake air introduced into the surge tank 36. For example, a flow rate of intake air which recirculates to upstream of the supercharger 33 through the bypass passage 38 increases as the opening of the by-pass valve 39 increases, and as a result, the boost pressure decreases.

The exhaust passage 40 is connected to the other side surface of the cylinder head 4 so as to communicate with the exhaust port 10. Burnt gas (exhaust gas) generated inside the combustion chamber 6 is discharged outside through the exhaust port 10 and the exhaust passage 40.

A catalytic converter 41 is provided to the exhaust passage 40. A three-way catalyst 41a and a GPF (Gasoline Particulate Filter) 41b are built in the catalytic converter 41 in this order from upstream.

The three-way catalyst 41a is to purify hazardous components (HC, CO, and NOR) contained in exhaust gas which circulates the exhaust passage 40. In detail, when an air-fuel ratio of exhaust gas which passes through the three-way catalyst 41a is near and higher than a stoichiometric air-fuel ratio (lean), the three-way catalyst 41a purifies (oxidizes) HC and CO at a high purification rate, and on the other hand, when the air-fuel ratio of exhaust gas is near and lower than the stoichiometric air-fuel ratio (rich), purifies (reduces) NOR at a high purification rate. The GPF 41b is to capture particulate matter (PM) contained in exhaust gas.

Corresponding parts of the exhaust passage 40 are provided with a linear air-fuel (A/F) sensor SN11 and a $\lambda O_2$ sensor SN12 each of which detects an air-fuel ratio of exhaust gas, and a $NO_x$ sensor SN13 which detects a concentration of NO contained in exhaust gas.

The linear A/F sensor SN11 is provided to a portion of the exhaust passage 40 upstream of the catalytic converter 41, and detects the air-fuel ratio of exhaust gas which flows into the catalytic converter 41. The $\lambda O_2$ sensor SN12 is provided to a portion of the exhaust passage 40 downstream of the three-way catalyst 41a and upstream of the GPF 41b, and is attached to a portion between the three-way catalyst 41a and the GPF 41b of the catalytic converter 41. The $\lambda O_2$ sensor SN12 detects the air-fuel ratio of exhaust gas after passing through the three-way catalyst 41a. The NOR sensor SN13 is provided to a portion of the exhaust passage 40 downstream of the catalytic converter 41, and detects a $NO_x$ concentration of exhaust gas which flowed out of the catalytic converter 41. In detail, the $NO_x$ sensor SN13 is provided to a portion immediately downstream of the catalytic converter 41 and upstream of a portion of the exhaust passage 40 to which the EGR passage 51 (described later) is connected.

The linear A/F sensor SN11 is a so-called all-range type A/F sensor, and outputs a value substantially proportional to the air-fuel ratio over a wide range. The $\lambda O_2$ sensor SN12 is a so-called $O_2$ sensor, and outputs a value according to the air-fuel ratio only when the air-fuel ratio is near the stoichiometric air-fuel ratio. These sensors are well-known, and therefore, the detailed description of the structure is omitted.

Figure 2:
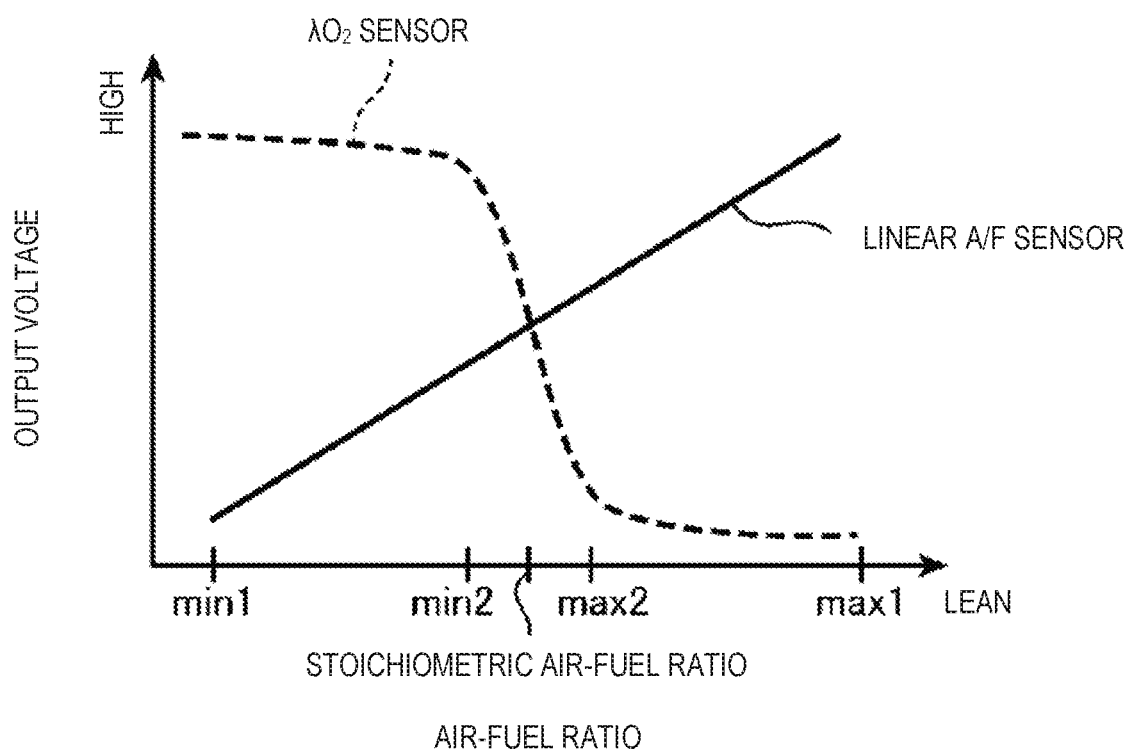
FIG. 2 is a graph illustrating a relation between each of output values of a linear air-fuel ratio (A/F) sensor and a $\lambda O_2$ sensor, and an air-fuel ratio.

The relationships between the output values of the linear A/F sensor SN11 and the $\lambda O_2$ sensor SN12, and the air-fuel ratio are briefly described using FIG. 2. FIG. 2 is a graph illustrating the relationships between the output values (output voltages) of the sensors SN11 and SN12, and the air-fuel ratio. In FIG. 2, a solid line indicates the output value of the linear A/F sensor SN11, and a broken line indicates the output value of the $\lambda O_2$ sensor SN12.

As illustrated by the solid line in FIG. 2, the output value of the linear A/F sensor SN11 changes according to the air-fuel ratio over a wide range of the air-fuel ratio from a first air-fuel ratio min1 which is sufficiently lower than the stoichiometric air-fuel ratio to a second air-fuel ratio max1 which is sufficiently higher than the stoichiometric air-fuel ratio. The output value of the linear A/F sensor SN11 changes substantially in proportion to the air-fuel ratio.

On the other hand, as illustrated by the broken line in FIG. 2, although the output value of the $\lambda O_2$ sensor SN12 changes according to the air-fuel ratio from a third air-fuel ratio min2 which is slightly lower than the stoichiometric air-fuel ratio to a fourth air-fuel ratio max2 which is slightly higher than the stoichiometric air-fuel ratio, it almost never changes according to the air-fuel ratio if the air-fuel ratio deviates from this range. Thus, the range of the air-fuel ratio detectable by the $\lambda O_2$ sensor SN12 is limited to near the stoichiometric air-fuel ratio, and is narrower than the range of the air-fuel ratio detectable by the linear A/F sensor SN11. Therefore, in the area deviated from near the stoichiometric air-fuel ratio, the detection accuracy of the air-fuel ratio by the $\lambda O_2$ sensor SN12 becomes lower than the detection accuracy of the linear A/F sensor SN11. However, as apparent from the comparison between the broken line and the solid line in FIG. 2, the amount of change in the output value of the $\lambda O_2$ sensor SN12 with respect to the air-fuel ratio near the stoichiometric air-fuel ratio is larger than the amount of change in the output value of the linear A/F sensor SN11 with respect to the air-fuel ratio. Therefore, near the stoichiometric air-fuel ratio, the detection accuracy of the air-fuel ratio by the $\lambda O_2$ sensor SN12 becomes higher than that by the linear A/F sensor SN11.

The EGR device 50 has the EGR passage 51 which connects the exhaust passage 40 with the intake passage 30, and an EGR cooler 52 and an EGR valve 53 which are provided to the EGR passage 51. The EGR passage 51 mutually connects a portion of the exhaust passage 40 downstream of the catalytic converter 41 and a portion of the intake passage 30 between the throttle valve 32 and the supercharger 33. The EGR cooler 52 cools, by a heat exchange, exhaust gas (external EGR gas) which recirculates from the exhaust passage 40 to the intake passage 30 through the EGR passage 51. The EGR valve 53 is provided to the EGR passage 51 downstream of the EGR cooler 52 (closer to the intake passage 30) so as to be openable and closable, and adjusts a flow rate of exhaust gas which circulates the EGR passage 51.

A pressure difference sensor SN8 which detects a difference between a pressure upstream of the EGR valve 53 and a pressure downstream of the EGR valve 53 is provided to the EGR passage 51.

(2) Control System

Figure 3:
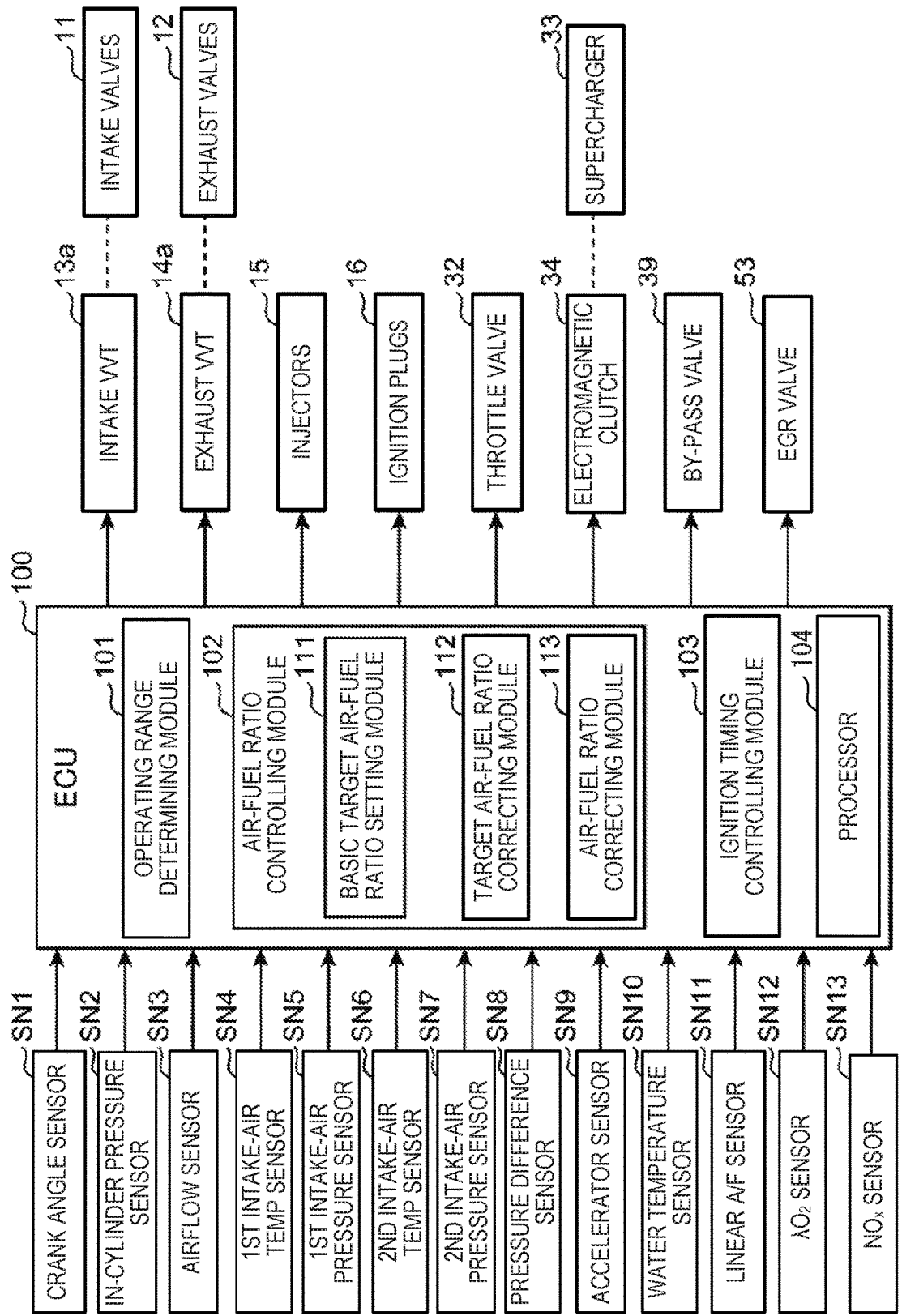
FIG. 3 is a block diagram illustrating a control system of the engine.

FIG. 3 is a block diagram illustrating a control system of the engine. ECU 100 illustrated in this figure is a microprocessor which totally controls the engine, and is comprised of a well-known processor 104 such as a central processing unit (CPU) having associated ROM, RAM, etc.

Detection signals of various sensors are inputted into the ECU 100. For example, the ECU 100 is electrically connected to the crank angle sensor SN1, the in-cylinder pressure sensor SN2, the airflow sensor SN3, the first and second intake air temperature sensors SN4 and SN6, the first and second intake pressure sensors SN5 and SN7, the pressure difference sensor SN8, the water temperature sensor SN10, the linear A/F sensor SN11, the $\lambda O_2$ sensor SN12, and the $NO_x$ sensor SN13, which are described above. Information detected by these sensors (i.e., the crank angle, the engine speed, the in-cylinder pressure, the intake air flow rate, the intake air temperature, the intake pressure, the pressure difference of before and after the EGR valve 53, etc.), the air-fuel ratio of exhaust gas, and the $NO_x$ concentration of exhaust gas are sequentially inputted into the ECU 100. Moreover, the vehicle is provided with an accelerator sensor SN9 which detects an opening of the accelerator pedal operated by a driver who operates the vehicle, and this detection signal of the accelerator sensor SN9 is also inputted into the ECU 100.

The ECU 100 controls each part of the engine, while performing various determinations, calculations, etc. based on the input signals from the respective sensors. That is, the ECU 100 is electrically connected to the intake VVT 13a, the exhaust VVT 14a, the injector 15, the ignition plug 16, the throttle valve 32, the electromagnetic clutch 34, the by-pass valve 39, the EGR valve 53, etc., and outputs control signals to the respective devices based on the results of the calculation, etc. The ECU 100 is one example of a "controller." The ECU 100 includes, functionally, an operating range determining module 101, an air-fuel ratio controlling module 102, and an ignition timing controlling module 103. The processor 104 executes these modules to perform their respective functions. These modules are stored in non-transitory memory of the ECU 100 as software.

(3) Combustion Control

Figure 4:
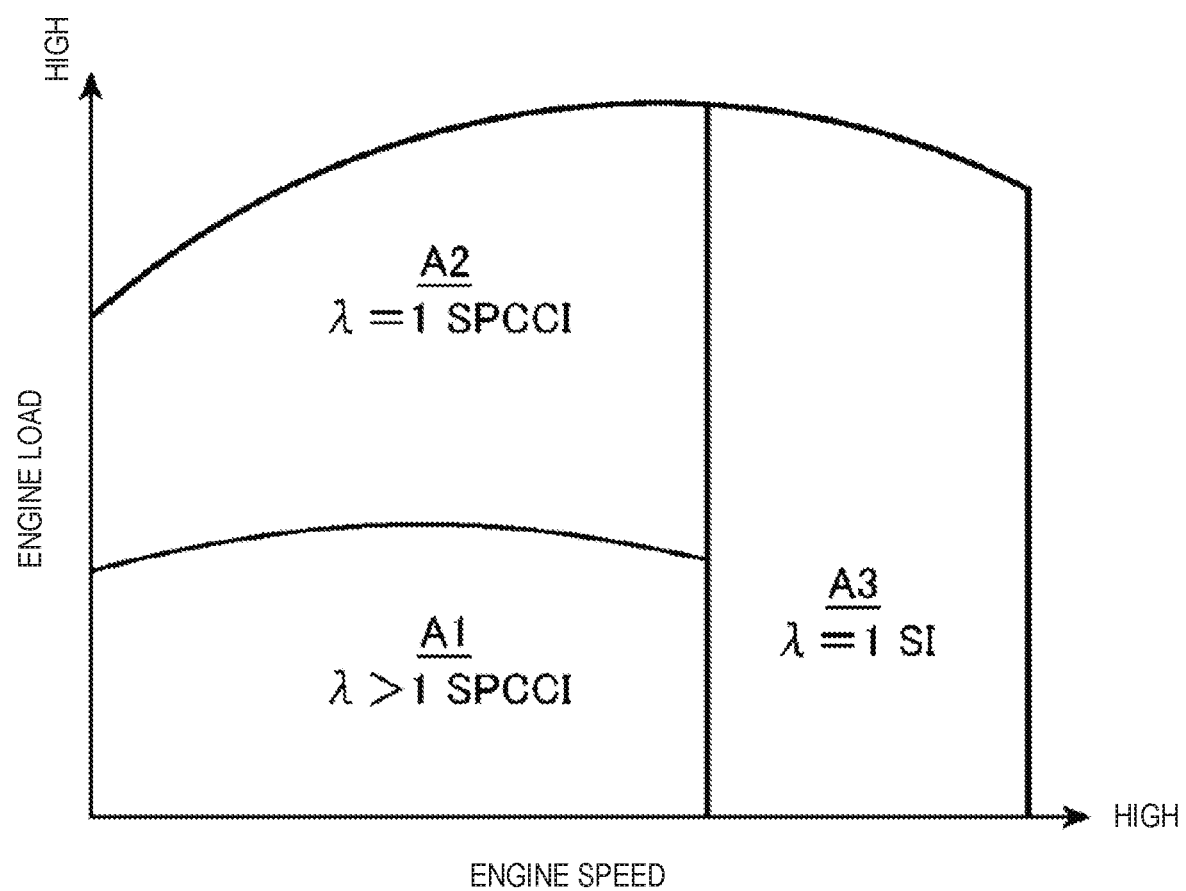
FIG. 4 is a characteristic chart of an operating range of the engine, where the operating range is classified into sub-ranges according to a combustion mode.

FIG. 4 is a characteristic chart illustrating a difference of the control according to the engine speed/load. As illustrated in this figure, the operating range of the engine can be roughly subdivided into three operating ranges A1-A3. Suppose that these operating ranges are a first operating range A1, a second operating range A2, and a third operating range A3, the first operating range A1 is a low-speed low-load range where both the engine speed and the engine load are low, the second operating range A2 is a low-speed high-load range where the engine speed is low and the engine load is high, and the third operating range A3 is a high-speed range where the engine speed is high. The ECU 100 determines in which operating range (the first to third operating ranges A1-A3) the current operating point is included based on the engine speed and the engine load which are detected by the crank angle sensor SN1, and then carries out the following control. The determination of the operating range is carried out by the operating range determining module 101. Note that the ECU 100 calculates the engine load based on the opening of the accelerator pedal detected by the accelerator sensor SN9, the engine speed, etc.

(3-1) First Operating Range A1 and Second Operating Range A2

In the first operating range A1 and the second operating range A2, partial compression ignition combustion (hereinafter, referred to as "SPCCI combustion") in which SI combustion and CI combustion are mixed is performed. Note that "SPCCI" in SPCCI combustion is an abbreviation of "SPark Controlled Compression Ignition."

SI combustion is a combustion mode in which the ignition plug 16 ignites the mixture gas, and the mixture gas is forcibly combusted by flame propagation which expands a combusting area from the ignited point to the perimeter. CI combustion is a combustion mode in which the mixture gas is combusted by self-ignition under an environment raised to a high temperature and a high pressure by compression of the piston 5. SPCCI combustion which is a mixture or combination of SI combustion and CI combustion is a combustion mode in which SI combustion of a portion of the mixture gas inside the combustion chamber 6 is carried out by jump-spark ignition performed under an environment immediately before the mixture gas self-ignites, and CI combustion of the remaining mixture gas inside the combustion chamber 6 is carried out by self-ignition after SI combustion (after a further increase in the temperature and the pressure accompanying SI combustion).

Figure 5:
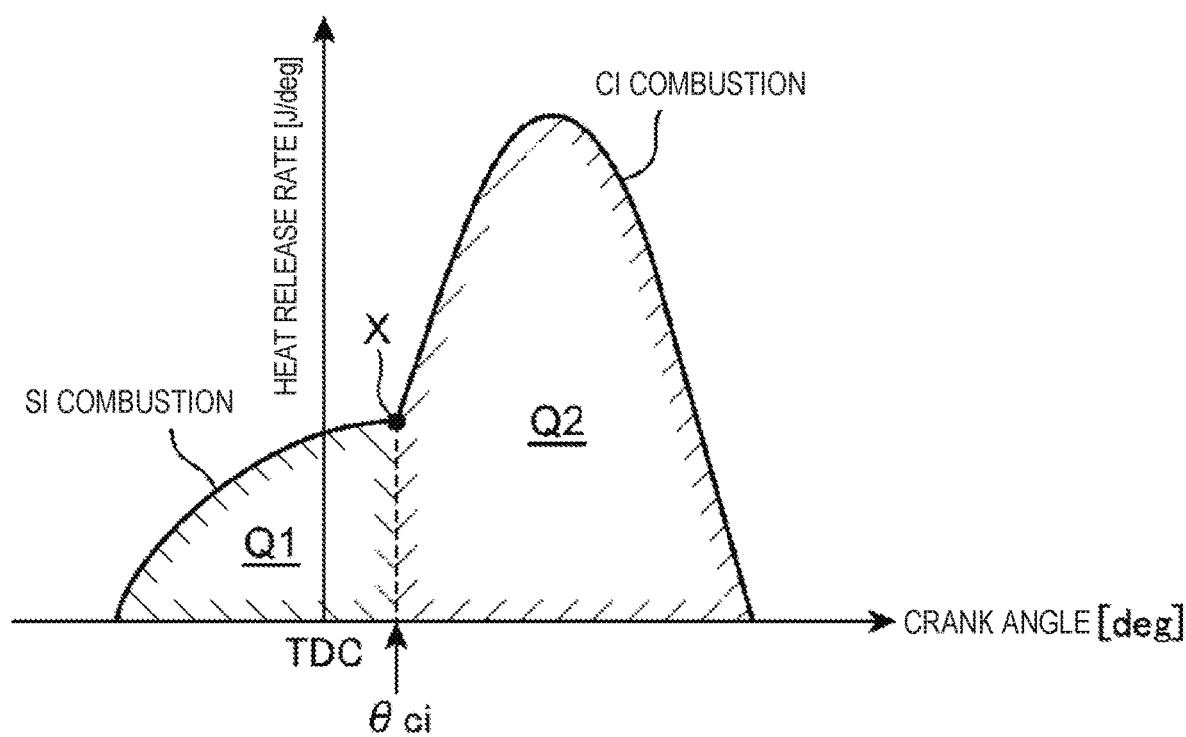
FIG. 5 is a graph illustrating a waveform of a rate of heat release during SPCCI combustion (partial compression ignition combustion).

FIG. 5 is a graph illustrating a change in a rate of heat release (J/deg) to the crank angle when SPCCI combustion occurs. In SPCCI combustion, the heat release during SI combustion becomes milder than the heat release during CI combustion. For example, as illustrated in FIG. 5, a waveform of the rate of heat release when SPCCI combustion is performed becomes small relatively in the rising slope. Moreover, the pressure fluctuation in the combustion chamber 6 (i.e., dP/dθ: P is the in-cylinder pressure and θ is the crank angle) during SI combustion also becomes milder than that during CI combustion. In other words, the waveform of the rate of heat release during SPCCI combustion is formed so that a first rate-of-heat-release part (a portion indicated by Q1) formed by SI combustion where the rising slope is relatively small and a second rate-of-heat-release part (a portion indicated by Q2) formed by CI combustion where the rising slope is relatively large, continue in this order.

When the temperature and the pressure inside the combustion chamber 6 increase by SI combustion, the unburnt mixture gas self-ignites accordingly, and CI combustion is then started. As illustrated in FIG. 5, the slope of the waveform for the rate of heat release changes from small to large at a timing of the self-ignition (i.e., a timing at which CI combustion starts). That is, the waveform of the rate of heat release in SPCCI combustion has a point of inflection (indicated by an "X" in FIG. 5) which appears at a timing θci where CI combustion starts.

After the start of CI combustion, SI combustion and CI combustion are performed in parallel. In CI combustion, since the heat release is larger than SI combustion, the rate of heat release becomes relatively large. However, since CI combustion is performed after a compression top dead center, the slope of the waveform for the rate of heat release will not become excessive. That is, since a motoring pressure decreases due to a descent of the piston 5 when the piston 5 passes through the compression top dead center, this reduces the rise of the rate of heat release, and as a result, it is avoided that dp/dθ during CI combustion becomes excessive. Thus, in SPCCI combustion, because of the nature in which CI combustion is performed after SI combustion, dp/dθ used as an index of combustion noise is difficult to become excessive, and therefore, combustion noise can be reduced compared with simple CI combustion (when carrying out CI combustion for all of the fuel).

SPCCI combustion is also ended with the end of CI combustion. Since a combustion speed of CI combustion is fast compared with SI combustion, it can bring the end time of combustion forward compared with the simple SI combustion (when carrying out SI combustion for all of the fuel). In other words, by SPCCI combustion, the end time of combustion can be brought closer to the compression top dead center in expansion stroke. Therefore, in SPCCI combustion, fuel efficiency can be improved compared with the simple SI combustion.

(First Operating Range)

In the first operating range A1 where the load is low, among the range where SPCCI combustion is performed, the air-fuel ratio (A/F) inside the combustion chamber 6 is made higher than the stoichiometric air-fuel ratio (lean) in order to improve fuel efficiency. That is, the injector 15 injects into the combustion chamber 6 such an amount of fuel that the air-fuel ratio (A/F) inside the combustion chamber 6 becomes higher than the stoichiometric air-fuel ratio. Here, when the air-fuel ratio inside the combustion chamber 6 is made higher than the stoichiometric air-fuel ratio, it becomes impossible for the three-way catalyst 41a to fully purify NOR. Therefore, in the first operating range A1, the air-fuel ratio inside the combustion chamber 6 is made higher to the extent of an amount of raw NOR which is NOR generated inside the combustion chamber 6 becoming sufficiently small. That is, when the air-fuel ratio inside the combustion chamber 6 is sufficiently high, since the temperature inside the combustion chamber 6 can be kept low, the generated amount of NO decreases. In this embodiment, the air-fuel ratio inside the combustion chamber 6 is set to about 30:1 in the first operating range A1. The details of this control of the air-fuel ratio will be described later.

Note that λ in FIG. 4 indicates an excess air factor, the excess air factor "λ=1" means that the air-fuel ratio inside the combustion chamber 6 is the stoichiometric air-fuel ratio, and the excess air factor "λ>1" means that the air-fuel ratio inside the combustion chamber 6 is higher than the stoichiometric air-fuel ratio.

Moreover, in the first operating range A1, each part of the engine is controlled by the ECU 100 as follows, so that SPCCI combustion is achieved.

The injector 15 injects the entire amount of fuel to be injected in one cycle, or a great portion of the entire amount of fuel during a compression stroke. For example, in the first operating range A1, the injector 15 injects the fuel dividedly at two timings during a period from the middle stage to the later stage of the compression stroke. The ignition plug 16 ignites the mixture gas near the compression top dead center. By using this ignition as a trigger, SPCCI combustion is started, a portion of the mixture gas inside the combustion chamber 6 combusts by flame propagation (SI combustion), and the remaining mixture gas then combusts by self-ignition (CI combustion). The detail of controlling an ignition timing which is a timing at which the ignition plug 16 performs ignition will be described later.

The intake VVT 13a and the exhaust VVT 14a set the timings of the intake and exhaust valves 11 and 12 so that the valve overlap period during which both the intake and exhaust valves 11 and 12 are opened is fully formed over the exhaust top dead center. Therefore, the internal EGR that makes burnt gas remain inside the combustion chamber 6 is achieved, and thereby, the temperature (an initial temperature before compression) inside the combustion chamber 6 is raised.

The throttle valve 32 is fully opened. The EGR valve 53 is opened to a given opening, and gas inside the exhaust passage 40 is introduced into the combustion chamber 6 as external EGR gas. In the first operating range A1, since the air-fuel ratio (A/F) is set as leaner than the stoichiometric air-fuel ratio as described above, and in addition, the EGR gas (external EGR gas and internal EGR gas) is introduced into the combustion chamber 6, a gas-fuel ratio (G/F) which is a weight ratio of the entire gas to the fuel inside the combustion chamber 6 becomes lean.

The swirl valve 18 is closed to a low opening which is fully closed or nearly fully closed. Therefore, the strong swirl flow is formed inside the combustion chamber 6. This swirl flow grows during an intake stroke, and remains until the middle of the compression stroke. Therefore, when fuel is injected during the compression stroke as described above, stratification of the fuel is achieved by an action of the swirl flow. That is, when fuel is injected after the middle stage of the compression stroke under a situation where the swirl flow exists, the injected fuel is collected to a central part of the combustion chamber 6 where the swirl flow is comparatively weak. Therefore, the stratification of fuel is achieved because a concentration difference arises in which the fuel concentration in the central part of the combustion chamber 6 becomes dense compared with an area outside the central part (perimeter part).

The supercharger 33 is switched to an OFF state in a partial range of the first operating range A1 where the engine speed is low. That is, while the electromagnetic clutch 34 is disconnected to release the connection between the supercharger 33 and the engine body 1, the boost by the supercharger 33 is suspended by fully opening the by-pass valve 39. On the other hand, in a partial range of the operating ranges A1 where the engine speed is high, the supercharger 33 is switched to an ON state. That is, the boost by the supercharger 33 is performed by connecting the electromagnetic clutch 34 to connect the supercharger 33 and the engine body 1. Here, the opening of the by-pass valve 39 is controlled so that the pressure inside the surge tank 36 (boost pressure) detected by the second intake pressure sensor SN7 becomes in agreement with a target pressure defined beforehand for every operating condition (the engine speed and the load).

(Second Operating Range)

The second operating range A2 is a range where the engine load is high and the amount of fuel supplied to the combustion chamber 6 is large compared with the first operating range A1. Therefore, in the second operating range A2, it is difficult to make the air-fuel ratio inside the combustion chamber 6 high to the extent to sufficiently reduce the amount of raw NOR. Thus, in the second operating range A2, the air-fuel ratio of exhaust gas, i.e., the air-fuel ratio inside the combustion chamber 6, is made into the stoichiometric air-fuel ratio to purify NOR in the three-way catalyst 41a. That is, in the second operating range A2, the air-fuel ratio inside the combustion chamber 6 is fundamentally made into the stoichiometric air-fuel ratio. Similarly to above, the details of this control of the air-fuel ratio will be described later.

Moreover, in the second operating range A2, each part of the engine is controlled by the ECU 100 as follows so that SPCCI combustion is achieved.

The injector 15 injects a portion of fuel to be injected in one cycle during the intake stroke, and injects the remaining fuel during the compression stroke. The ignition plug 16 ignites the mixture gas near the compression top dead center. Also in the second operating range A2, SPCCI combustion is started using this ignition as a trigger, a portion of the mixture gas inside the combustion chamber 6 combusts by flame propagation (SI combustion), and the remaining mixture gas then combusts by self-ignition (CI combustion). As described above, the detail of controlling the ignition timing which is the timing at which the ignition plug 16 performs the ignition will be described later.

The intake VVT 13a and the exhaust VVT 14a control the valve timings of the intake valve 11 and the exhaust valve 12 so that the internal EGR is performed only in a lower-load part of the second operating range A2 (in other words, the internal EGR is suspended on a higher load side).

The throttle valve 32 is fully opened. The EGR valve 53 is controlled so that the amount of exhaust gas which recirculates through the EGR passage 51 (external EGR gas) decreases as the load becomes higher. Near the highest engine load, the EGR valve 53 is fully closed, and the amount of external EGR gas is made nearly zero. In connection with this, also in the second operating range A2, the gas-fuel ratio (G/F) inside the combustion chamber 6 is made lean, except for the vicinity of the highest engine load.

The swirl valve 18 is opened to a suitable middle opening other than "fully closed" and "fully open," and the opening is made larger as the load becomes high.

The supercharger 33 is made into the OFF state in a partial range of the second operating range A2 where both the engine speed and the engine load are low. On the other hand, in the other partial range of the second operating range A2, the supercharger 33 is made into the ON state.

(3-2) Third Operating Range

In the third operating range A3 which is on the higher engine speed side of the first and second operating ranges A1 and A2, comparatively orthodox SI combustion is performed. In order to achieve the SI combustion, each part of the engine is controlled by the ECU 100 as follows in the third operating range A3.

The injector 15 injects the fuel over a given period which overlaps with at least the intake stroke. The ignition plug 16 ignites the mixture gas near the compression top dead center. In the third operating range A3, SI combustion is started using this ignition as a trigger, and the entire mixture gas inside the combustion chamber 6 combusts by flame propagation.

The supercharger 33 is made into the ON state. The throttle valve 32 is fully opened. The valve opening of the EGR valve 53 is controlled so that the air-fuel ratio (A/F) inside the combustion chamber 6 becomes at or slightly richer than the stoichiometric air-fuel ratio. On the other hand, the gas-fuel ratio (G/F) inside the combustion chamber 6 is made lean except for the vicinity of the highest engine load. The swirl valve 18 is fully opened.

(4) Ignition-timing Control

The details of the control of the ignition timing performed in the first operating range A1 and the second operating range A2, i.e., in the range where SPCCI combustion is carried out, are described. The control of the ignition timing is carried out by the ignition timing controlling module 103. In this embodiment, in these operating ranges A1 and A2, a target value of a combustion center-of-gravity timing is set from a viewpoint of combustion noise and combustion stability, and the ignition timing is controlled so that the target value is achieved. The combustion center-of-gravity timing is a timing at which an amount of heat release produced inside the combustion chamber 6 becomes 50% of the total amount of heat release produced inside the combustion chamber 6 in one combustion cycle. Note that the control of the ignition timing described here is an example of a "first control."

Figure 6:
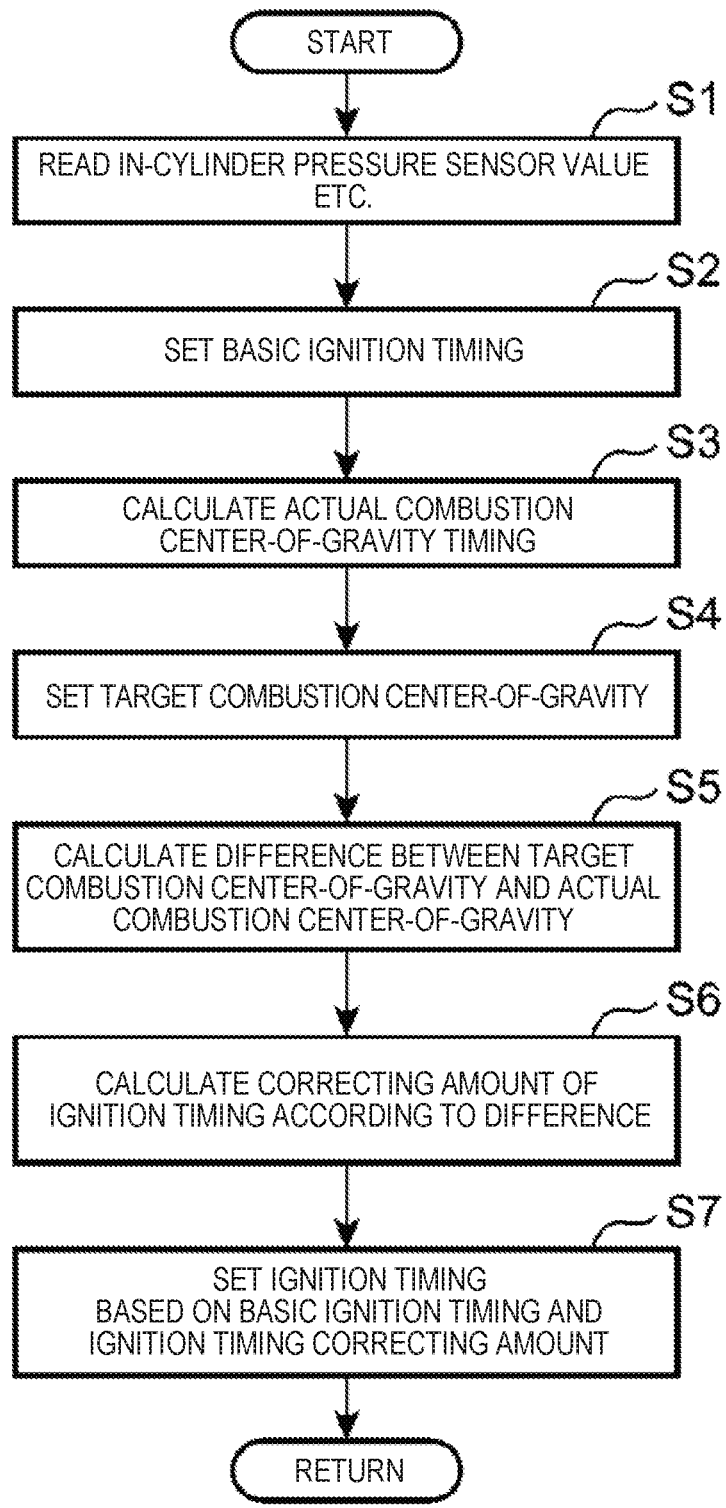
FIG. 6 is a flowchart illustrating a procedure of a correction of an ignition timing.

This is described concretely using a flowchart of FIG. 6.

First, at Step S1, the ECU 100 (the ignition timing controlling module 103) reads the in-cylinder pressure detected by the in-cylinder pressure sensor SN2, the engine speed detected by the crank angle sensor SN1, etc.

Next, at Step S2, the ECU 100 sets a basic ignition timing which is a basic value of the ignition timing. In this embodiment, the basic ignition timing is set beforehand based on the engine speed and the engine load, and is stored in the ECU 100 as a map. The ECU 100 extracts a value corresponding to the current engine speed and engine load from the map, and sets it as the basic ignition timing.

Next, at Step S3, the ECU 100 calculates a combustion center-of-gravity timing of the last combustion cycle or a few combustion cycles before. Below, the obtained combustion center-of-gravity timing may be referred to as an "actual combustion center-of-gravity timing." In detail, the ECU 100 calculates a rate of heat release at each crank angle based on the in-cylinder pressure, the engine speed, etc., and integrates the rates of heat release with respect to the crank angle. Then, the ECU 100 calculates the value obtained by integrating the rates of heat release for one combustion cycle as the total amount of heat release per one combustion cycle, and calculates a timing at which the integrated value of the rates of heat release becomes 50% of the total amount of heat release, as the actual combustion center-of-gravity timing.

Next, at Step S4, the ECU 100 sets a target combustion center-of-gravity timing which is a target value of the combustion center-of-gravity timing. The ECU 100 corrects a preset basic target combustion center-of-gravity timing by parameters related to the temperature and pressure inside the combustion chamber 6, and a gas flow, and sets it as the target combustion center-of-gravity timing.

In this embodiment, the basic target combustion center-of-gravity timing is set beforehand based on the engine speed and the engine load, and is stored in the ECU 100 as the map. The ECU 100 extracts the value corresponding to the current engine speed and engine load from the map, and sets it as the basic target combustion center-of-gravity timing. This basic target combustion center-of-gravity timing corresponds to the basic ignition timing, and it is set at the combustion center-of-gravity timing when igniting at the basic ignition timing in a state inside the combustion chamber 6 (states of the temperature, pressure, and gas flow) is made into a basic state.

Moreover, the ECU 100 calculates an EGR rate which is a rate of the mass of EGR gas (burnt gas) to the total amount of mass of the gas inside the combustion chamber 6 based on the opening of the EGR valve 53, the intake air flow rate detected by the airflow sensor SN3, etc. Then, the ECU 100 corrects the basic target combustion center-of-gravity timing based on the EGR rate, the engine water temperature detected by the water temperature sensor SN10, the in-cylinder pressure, the valve timings of the intake valve 11 and the exhaust valve 12, the valve opening of the swirl valve 18, etc. In detail, when the EGR rate is lower than a preset value (a value in the basic state), and the engine water temperature and the in-cylinder pressure are higher than preset values (values in the basic state), and when the mixture gas combusts easily, and in connection with this, the combustion noise increases (when the noise becomes larger than the combustion noise in the basic state), the basic target combustion center-of-gravity timing is set at a timing on the retarding side of the target combustion center-of-gravity timing, in order to prevent the increase in the combustion noise. Moreover, when the EGR rate is higher than the preset value, the engine water temperature and in-cylinder pressure are lower than the preset values, and the combustion stability tends to degrade, the target combustion center-of-gravity timing is set at a timing on the advancing side of the basic target combustion center-of-gravity timing so that suitable SPCCI combustion is stably achieved.

Next, at Step S5, the ECU 100 calculates a difference between the target combustion center-of-gravity timing set at Step S4 and the actual combustion center-of-gravity timing calculated at Step S3. Next, at Step S6, the ECU 100 calculates a correcting amount of the ignition timing according to the difference calculated at Step S4. Next, at Step S7, the ECU 100 corrects the basic ignition timing set at Step S2 by the difference calculated at Step S4, and sets a final ignition timing which is to be instructed to the ignition plug 16 as the ignition timing. In detail, when the actual combustion center-of-gravity timing is on the advancing side of the target combustion center-of-gravity timing, the basic ignition timing is corrected to the retarding side, and on the other hand, when the actual combustion center-of-gravity timing is on the retarding side of the target combustion center-of-gravity timing, the basic ignition timing is corrected to the advancing side. In this embodiment, the retarding amount and the advancing amount, i.e., the correcting amount calculated at Step S6 becomes a larger value as the difference between the target combustion center-of-gravity timing and the actual combustion center-of-gravity timing which is calculated at Step S5 increases.

(5) Air-fuel Ratio Control

The details of the control of the air-fuel ratio performed in the first operating range A1 and the second operating range A2, i.e., the range where SPCCI combustion is carried out is described. This control of the air-fuel ratio is carried out by the air-fuel ratio controlling module 102. The air-fuel ratio controlling module 102 includes, functionally, a basic target air-fuel ratio setting module 111, a target air-fuel ratio correcting module 112, and an air-fuel ratio correcting module 113.

The basic target air-fuel ratio setting module 111 sets a basic value of the target air-fuel ratio which is a target value of the air-fuel ratio inside the combustion chamber 6. Below, the basic value of the target air-fuel ratio is suitably referred to as a "basic target air-fuel ratio."

The target air-fuel ratio correcting module 112 corrects the basic target air-fuel ratio set by the basic target air-fuel ratio setting module 111. Below, the target air-fuel ratio after being corrected by the target air-fuel ratio correcting module 112 is suitably referred to as an "instructed target air-fuel ratio."

The air-fuel ratio correcting module 113 corrects the injection amount based on the detection value of the linear A/F sensor SN11 so that the air-fuel ratio inside the combustion chamber 6 becomes the instructed target air-fuel ratio. Thus, in this embodiment, the air-fuel ratio inside the combustion chamber 6 is adjusted by the correction of the injection amount, and therefore, the injector 15 is one example of an "air-fuel ratio changer."

The details of the control carried out by the air-fuel ratio correcting module 113 are described first.

The air-fuel ratio correcting module 113 calculates the air-fuel ratio of exhaust gas detected at the position of the linear A/F sensor SN11, supposing the air-fuel ratio inside the combustion chamber 6 is set as the instructed target air-fuel ratio based on a distance between the combustion chamber 6 and the linear A/F sensor SN11, and the flow rate of intake air detected by the airflow sensor SN3 (hereinafter, this calculated value is referred to as a "target exhaust gas air-fuel ratio"). Then, the air-fuel ratio correcting module 113 carries out a feedback control of the injection amount so that the air-fuel ratio of exhaust gas detected by the linear A/F sensor SN11 becomes the target exhaust gas air-fuel ratio.

In detail, the air-fuel ratio correcting module 113 estimates an amount of air inside the combustion chamber 6 based on the flow rate of intake air detected by the airflow sensor SN3. Then, a basic injection amount which is the fundamental injection amount is calculated based on the air amount and the instructed target air-fuel ratio. Moreover, the air-fuel ratio correcting module 113 compares the air-fuel ratio of exhaust gas detected by the linear A/F sensor SN11 (hereinafter, referred to as a "first actual exhaust gas air-fuel ratio) and the target exhaust gas air-fuel ratio. Then, when the first actual exhaust gas air-fuel ratio is higher (leaner) than the target exhaust gas air-fuel ratio, since it means that the injection amount is short, the air-fuel ratio correcting module 113 carries out a correction to increase the basic injection amount by an amount corresponding to a value obtained by subtracting the target exhaust gas air-fuel ratio from the first actual exhaust gas air-fuel ratio to make it as the final injection amount. On the other hand, when the first actual exhaust gas air-fuel ratio is lower (richer) than the target exhaust gas air-fuel ratio, since it means the injection amount is excessive, the air-fuel ratio correcting module 113 carries out a correction to decrease the basic injection amount by an amount corresponding to a value obtained by subtracting the first actual exhaust gas air-fuel ratio from the target exhaust gas air-fuel ratio to make it as the final injection amount. In this embodiment, the injection amount is corrected by changing an injection period (a pulse width of the injection pulse of the injector 15).

Thus, in this embodiment, the injection amount is corrected based on the detection value of the linear A/F sensor SN11, so that the first actual exhaust gas air-fuel ratio becomes the target exhaust gas air-fuel ratio, i.e., the air-fuel ratio inside the combustion chamber 6 becomes the instructed target air-fuel ratio.

Next, the details of the controls carried out by the basic target air-fuel ratio setting module 111 and the target air-fuel ratio correcting module 112 are described. These controls differ in the first operating range A1 and the second operating range A2, and therefore, the details of these controls are described for each operating range.

Note that the control of the air-fuel ratio inside the combustion chamber 6 based on an actual $NO_x$ concentration performed in the first operating range A1 described here is one example of a "second control."

(Second Operating Range A2)

As described above, in the second operating range A2, the air-fuel ratio of the combustion chamber 6 is fundamentally made into the stoichiometric air-fuel ratio so that HC, CO, and $NO_x$ are purified by the three-way catalyst 41a. Therefore, if the operating range determining module 101 determines that the engine is operated in the second operating range A2, the basic target air-fuel ratio setting module 111 sets the basic target air-fuel ratio as the stoichiometric air-fuel ratio.

Here, if this basic target air-fuel ratio, i.e., the stoichiometric air-fuel ratio is made into the instructed target air-fuel ratio, the air-fuel ratio correcting module 113 adjusts the injection amount based on the detection value of the linear A/F sensor SN11 so that the air-fuel ratio of the combustion chamber 6 becomes the stoichiometric air-fuel ratio. However, as described above, the detection accuracy of the air-fuel ratio by the linear A/F sensor SN11 is comparatively low at near the stoichiometric air-fuel ratio. Therefore, there is a possibility that the air-fuel ratio in the three-way catalyst 41a cannot be controlled with sufficient accuracy to the stoichiometric air-fuel ratio, only by adjusting the injection amount based on the detection of the linear A/F sensor SN11. Moreover, for example, in association with a slow-down of the vehicle, when the fuel injection is suspended, a large amount of air may be introduced in the three-way catalyst 41a, and oxygen may be occluded in the three-way catalyst 41a. At this time, even if the air-fuel ratio upstream of the three-way catalyst 41a is the stoichiometric air-fuel ratio after a resumption of the fuel injection, the air-fuel ratio in the three-way catalyst 41a may become higher than the stoichiometric air-fuel ratio.

Therefore, in this embodiment, in order to make the air-fuel ratio in the three-way catalyst 41a into the stoichiometric air-fuel ratio more securely, the basic target air-fuel ratio is corrected so that the air-fuel ratio of exhaust gas detected by the $\lambda O_2$ sensor SN12 of which the detection accuracy of the air-fuel ratio near the stoichiometric air-fuel ratio is higher than the linear A/F sensor SN11, and which is provided downstream of the three-way catalyst 41a (hereinafter, suitably referred to as a second actual exhaust gas air-fuel ratio), becomes the stoichiometric air-fuel ratio. In detail, when the engine is operated in the second operating range A2, and the basic target air-fuel ratio is set as the stoichiometric air-fuel ratio, the target air-fuel ratio correcting module 112 calculates a difference between the second actual exhaust gas air-fuel ratio and the stoichiometric air-fuel ratio, and then calculates the correcting amount of the basic target air-fuel ratio according to the calculated difference. In detail, when the second actual exhaust gas air-fuel ratio is higher than the stoichiometric air-fuel ratio, the target air-fuel ratio correcting module 112 reduces a given amount from the basic target air-fuel ratio, and sets the reduced value as the instructed target air-fuel ratio. In this embodiment, this reducing amount is increased as the difference between the second actual exhaust gas air-fuel ratio and the stoichiometric air-fuel ratio becomes larger. Moreover, when the second actual exhaust gas air-fuel ratio is lower than the stoichiometric air-fuel ratio, the target air-fuel ratio correcting module 112 adds the given amount to the basic target air-fuel ratio, and then sets the added value as the instructed target air-fuel ratio. In this embodiment, this adding amount is increased as the difference between the second actual exhaust gas air-fuel ratio and the stoichiometric air-fuel ratio becomes larger.

(First Operating Range A1)

As described above, in the first operating range A1, the air-fuel ratio of the combustion chamber 6 is made higher than the stoichiometric air-fuel ratio so that raw $NO_x$ becomes smaller. Thus, if the operating range determining module 101 determines that the engine is operated in the first operating range A1, the basic target air-fuel ratio setting module 111 sets the basic target air-fuel ratio as a value higher than the stoichiometric air-fuel ratio. In this embodiment, the basic target air-fuel ratio in the first operating range A1 is stored in a map so as to be associated with the engine speed and the engine load, and the basic target air-fuel ratio setting module 111 extracts a value corresponding to the current engine speed and engine load from the map, and then sets it as the basic target air-fuel ratio.

By the air-fuel ratio inside the combustion chamber 6 being controlled by the air-fuel ratio correcting module 113 to be the basic target air-fuel ratio, the generated amount of raw $NO_x$ should become below a desired amount. However, for example, according to the variation due to the individual difference of the injector 15, a fuel-spray state of fuel injected from the injector 15 may differ from a state when the basic target air-fuel ratio is determined based on the map. Moreover, a flow state inside the combustion chamber 6 may differ from a state when the basic target air-fuel ratio is determined based on the map. In these cases, even if the air-fuel ratio inside the combustion chamber 6 is made into the basic target air-fuel ratio, the generated amount of raw $NO_x$ may exceed the desired amount, and there is a possibility that the amount of $NO_x$ discharged from the engine may not be kept below the given value only by controlling the air-fuel ratio inside the combustion chamber 6 to the basic target air-fuel ratio based on the detection of the linear A/F sensor SN11.

Therefore, in this embodiment, the basic target air-fuel ratio is corrected so that the $NO_x$ concentration detected by the $NO_x$ sensor SN13, i.e., the concentration of $NO_x$ actually discharged from the engine (hereinafter, suitably referred to as an "actual $NO_x$ concentration") becomes less than a preset target value. In detail, when the engine is operated in the first operating range A1 and the basic target air-fuel ratio is set as a value higher than the stoichiometric air-fuel ratio, the target air-fuel ratio correcting module 112 calculates a difference between the actual $NO_x$ concentration and a target $NO_x$ concentration which is its target value, and then calculates a correcting amount of the basic target air-fuel ratio according to this difference. In more detail, when the actual $NO_x$ concentration is higher than the target $NO_x$ concentration, the target air-fuel ratio correcting module 112 adds a given amount to the basic target air-fuel ratio so that the air-fuel ratio inside the combustion chamber 6 is made high (lean), and then sets the added value as the instructed target air-fuel ratio. In this embodiment, this adding amount is increased as the difference between the actual $NO_x$ concentration and the target $NO_x$ concentration becomes larger. Moreover, when the actual $NO_x$ concentration is lower than the target $NO_x$ concentration, the target air-fuel ratio correcting module 112 deducts a given amount from the basic target air-fuel ratio so that the air-fuel ratio inside the combustion chamber 6 is made low (rich), and then sets the deducted value as the instructed target air-fuel ratio. In this embodiment, this deducted amount is increased as the difference between the actual $NO_x$ concentration and the target $NO_x$ concentration becomes larger.

Figure 7:
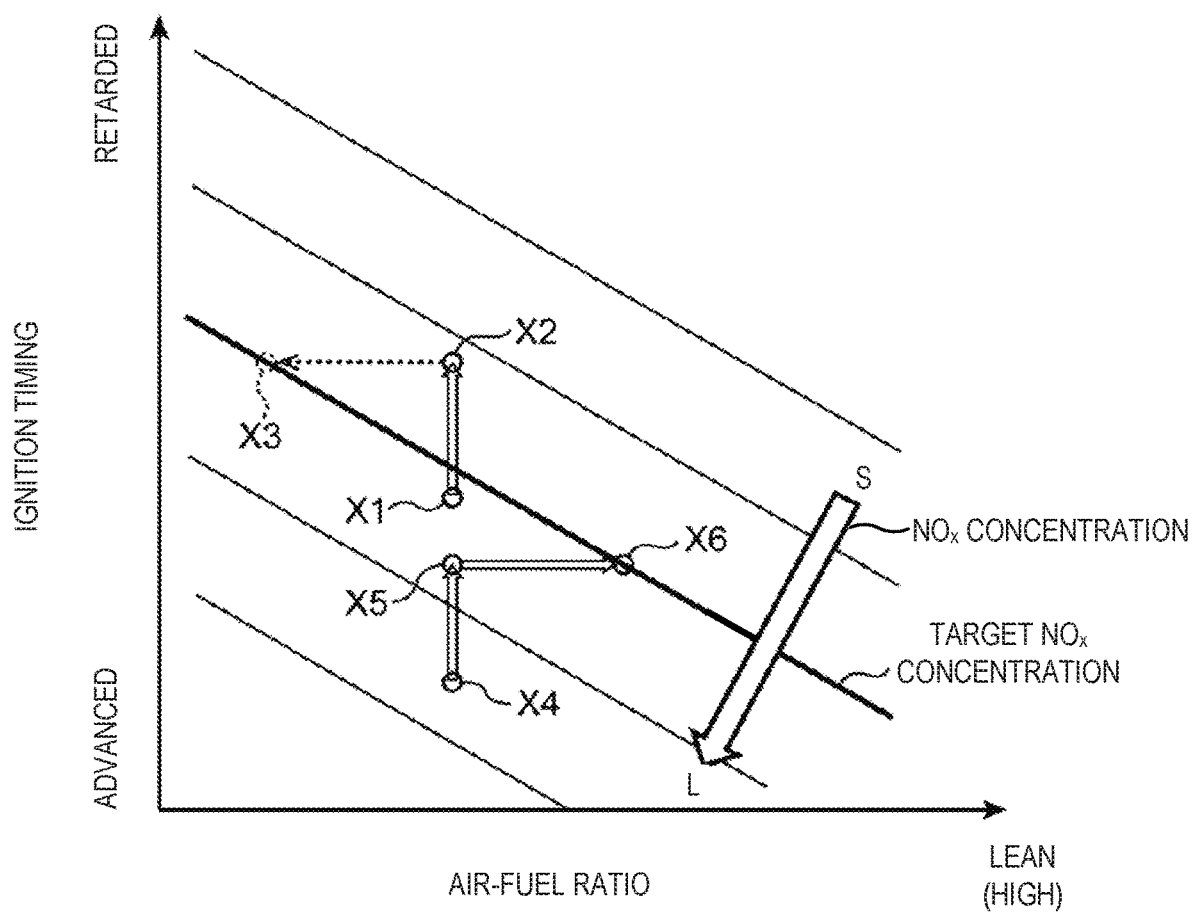
FIG. 7 is a graph illustrating a problem when a correction control of the ignition timing and a correction control of the air-fuel ratio are performed simultaneously.
Figure 8:
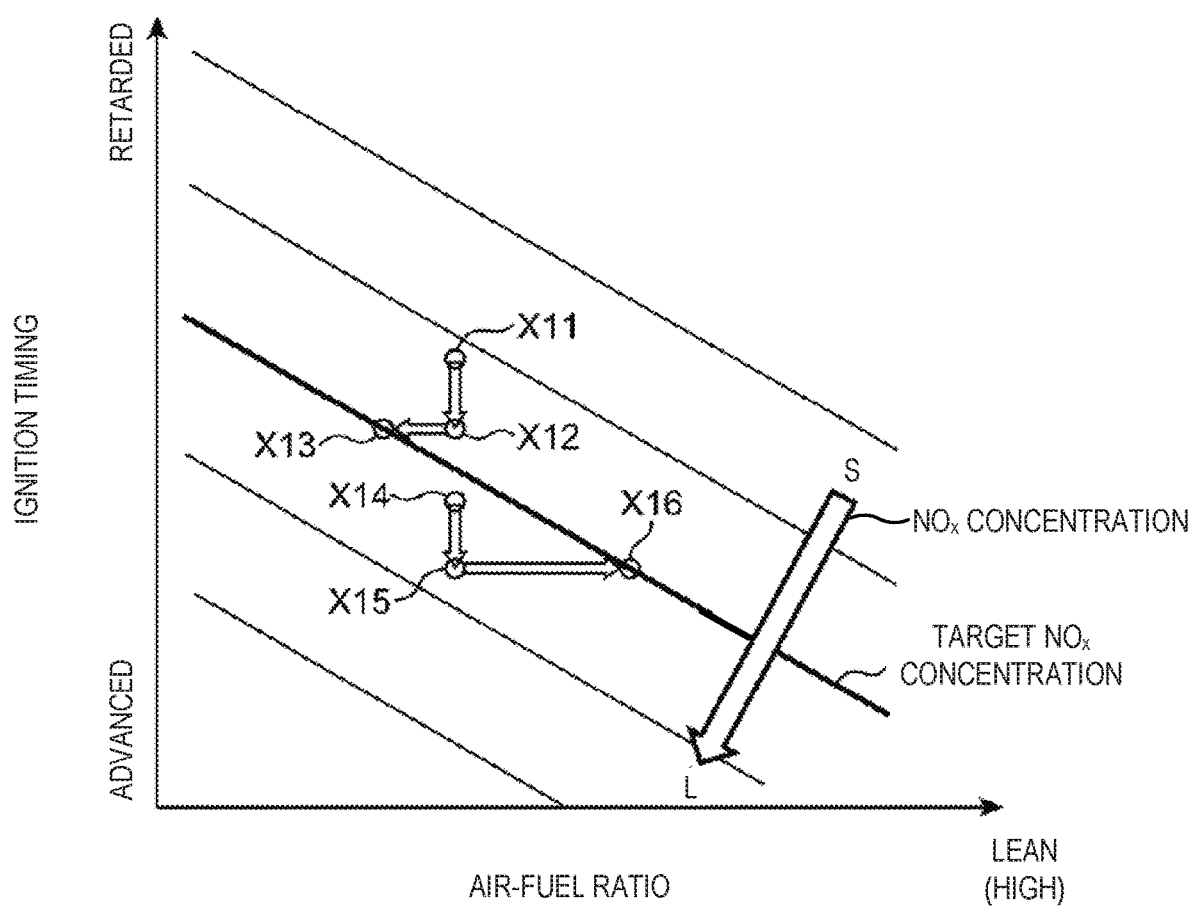
FIG. 8 is a graph illustrating a problem when the correction control of the ignition timing and the correction control of the air-fuel ratio are performed simultaneously.

Here, in this embodiment, the control to correct the ignition timing is carried out as described above. Therefore, if it is supposed that both the correction control of the ignition timing and the correction control of the air-fuel ratio based on the $NO_x$ concentration are simply carried out, controls of the following patterns (a)-(d) may be carried out. The patterns are described using FIGS. 7 and 8. FIGS. 7 and 8 are graphs illustrating a relation between the ignition timing, the air-fuel ratio inside the combustion chamber 6, and the $NO_x$ concentration of exhaust gas discharged from the combustion chamber 6. As illustrated in FIGS. 7 and 8, the $NO_x$ concentration becomes smaller as the ignition timing is more retarded. This is because the combustion becomes slow when the ignition timing is on the retarding side to reduce the combustion temperature.

(a) In FIG. 7, when combustion noise increases (or may increase) while the engine is operated at a point X1, the ignition timing is controlled to the retarding side toward a point X2 by carrying out the correction control of the ignition timing. When the actual $NO_x$ concentration is lower than the target $NO_x$ concentration after the control of the ignition timing, the air-fuel ratio inside the combustion chamber 6 is controlled to the lower side toward a point X3 by carrying out the correction control of the air-fuel ratio based on the $NO_x$ concentration.

(b) In FIG. 7, when combustion noise increases (or may increase) while the engine is operated at a point X4, the ignition timing is controlled to the retarding side toward a point X5 by carrying out the correction control of the ignition timing. When the actual $NO_x$ concentration is higher than the target $NO_x$ concentration after the control of the ignition timing, the air-fuel ratio inside the combustion chamber 6 is controlled to the higher side toward a point X6 by carrying out the correction control of the air-fuel ratio based on the $NO_x$ concentration.

(c) In FIG. 8, when the combustion becomes unstable (or may become unstable) while the engine is operated at a point X11, the ignition timing is controlled to the advancing side toward a point X12 by carrying out the correction control of the ignition timing. When the actual $NO_x$ concentration is lower than the target $NO_x$ concentration after the control of the ignition timing, the air-fuel ratio inside the combustion chamber 6 is controlled to the lower side toward a point X13 by carrying out the correction control of the air-fuel ratio based on the $NO_x$ concentration.

(d) In FIG. 8, when the combustion becomes unstable (or may become unstable) while the engine is operated at a point X14, the ignition timing is controlled to the advancing side toward a point X15 by carrying out the correction control of the ignition timing. When the actual $NO_x$ concentration is higher than the target $NO_x$ concentration after the control of the ignition timing, the air-fuel ratio inside the combustion chamber 6 is controlled to the higher side toward a point X16 by carrying out the correction control of the air-fuel ratio based on the $NO_x$ concentration.

Here, when the air-fuel ratio inside the combustion chamber 6 is changed to the higher side, the combustion of the mixture gas becomes slower, and on the other hand, when the air-fuel ratio is changed to the lower side, the combustion of the mixture gas is stimulated.

Therefore, in the pattern (b), after the ignition timing is corrected to the retarding side in association with the increase in the combustion noise, the air-fuel ratio inside the combustion chamber 6 is corrected to the higher side, i.e., to the side where the combustion becomes slower, and thereby the increase in combustion noise can be prevented also by the control of the air-fuel ratio. Moreover, in the pattern (c), after the ignition timing is corrected to the advancing side in connection with the combustion becoming unstable, the air-fuel ratio inside the combustion chamber 6 is corrected to the lower side, i.e., to the side where the combustion is stimulated, and thereby, the combustion stability is increased also by the control of the air-fuel ratio.

On the other hand, in the pattern (a), after the ignition timing is corrected to the retarding side in association with the increase in the combustion noise, the air-fuel ratio is corrected to the lower side, i.e., to the side where the combustion is stimulated. Therefore, in the pattern (a), there is a possibility that the increase in combustion noise cannot fully be controlled. In particular, in the pattern (a), in addition to the ignition timing is retarded, the air-fuel ratio is made lower, and therefore, there is a possibility that the fuel efficiency is lowered. Moreover, in the pattern (d), after the ignition timing is corrected to the advancing side in connection with the combustion becoming unstable, the air-fuel ratio is corrected to the higher side, i.e., to the side where the combustion becomes slower. Therefore, in the pattern (d), there is a possibility that the combustion becoming unstable cannot fully be prevented.

Thus, in this embodiment, in the pattern (a) and the pattern (d), the control of the air-fuel ratio based on the $NO_x$ concentration is suspended. In detail, both in a case where it is the pattern (a), the ignition timing is retarded from the basic ignition timing, and the actual $NO_x$ concentration is lower than the target $NO_x$ concentration, and in a case where it is the pattern (d), the ignition timing is advanced from the basic ignition timing, and the actual $NO_x$ concentration is higher than the target $NO_x$ concentration, the control of the air-fuel ratio based on the $NO_x$ concentration is suspended.

That is, when the engine is operated in the first operating range A1 and the basic target air-fuel ratio is set as a value higher than the stoichiometric air-fuel ratio, the target air-fuel ratio correcting module 112 basically controls the air-fuel ratio based on the $NO_x$ concentration, but when the ignition timing is corrected to the retarding side from the basic ignition timing and the actual $NO_x$ concentration is lower than the target $NO_x$ concentration, and when the ignition timing is corrected to the advancing side from the basic ignition timing and the actual $NO_x$ concentration is higher than the target $NO_x$ concentration, the correction of the air-fuel ratio based on the $NO_x$ concentration is suspended.

Figure 9:
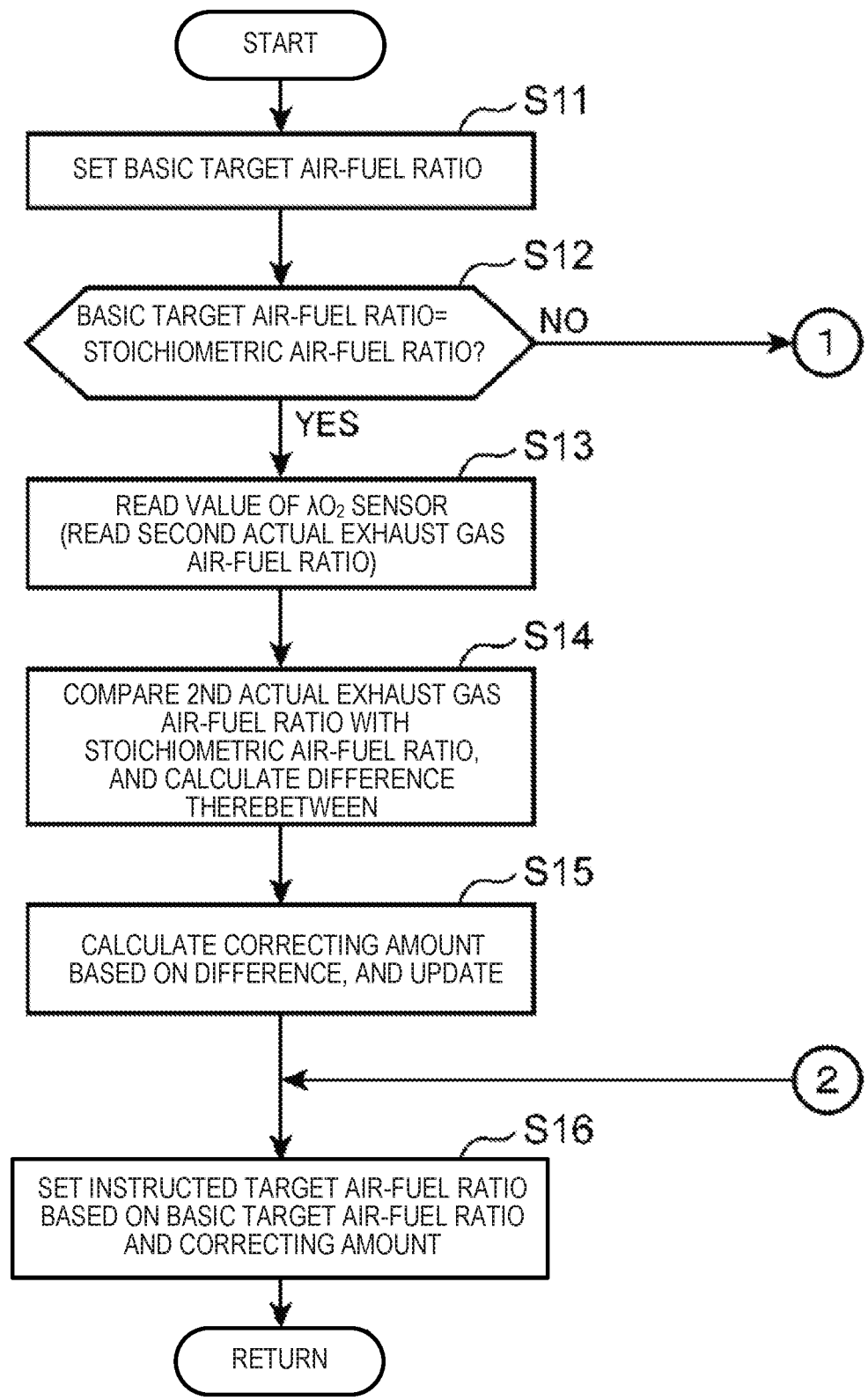
FIG. 9 is a flowchart illustrating a part of a procedure of a correction of a target air-fuel ratio.
Figure 10:
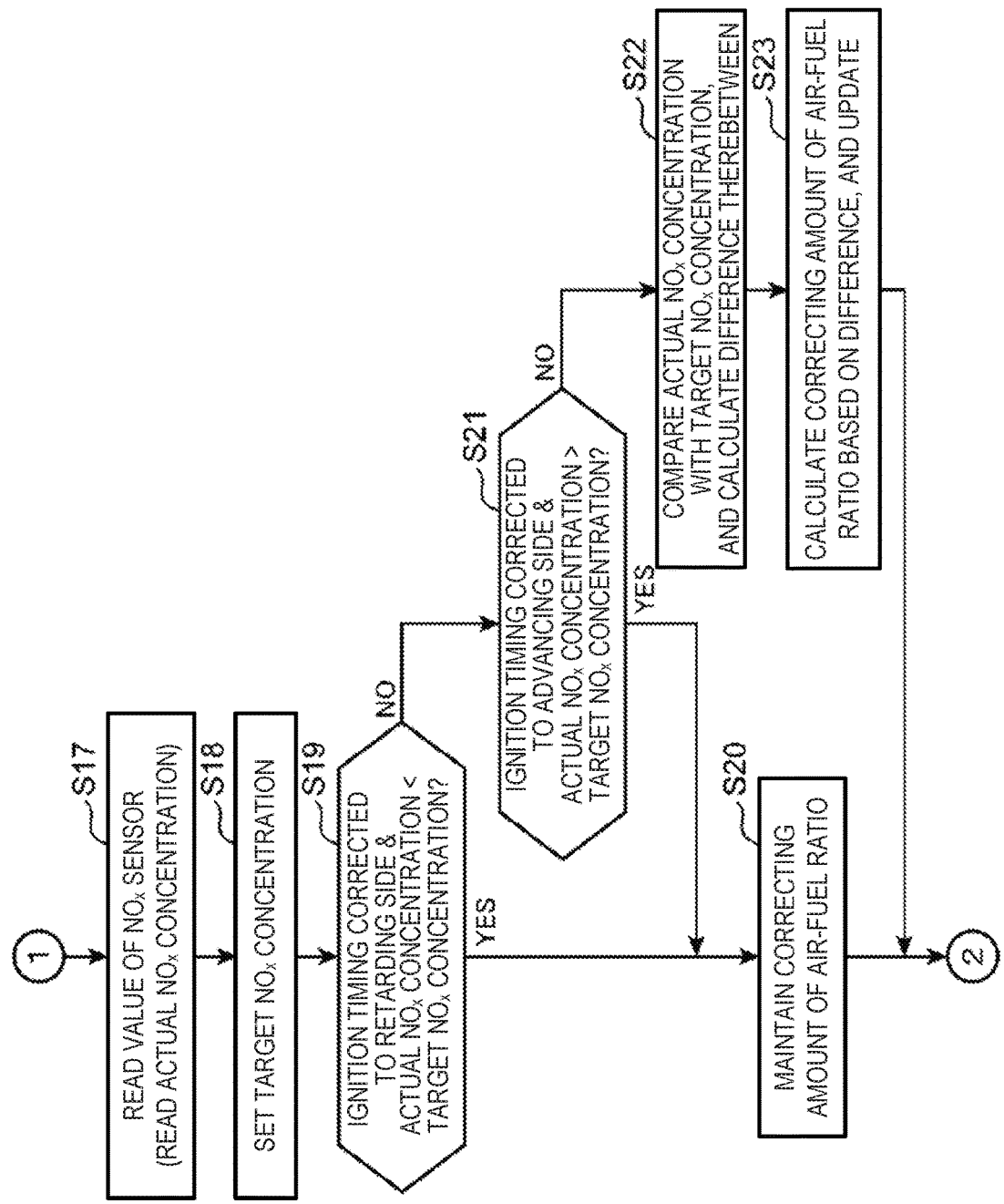
FIG. 10 is a flowchart illustrating a part of the procedure of the correction of the target air-fuel ratio.
Figure 11:
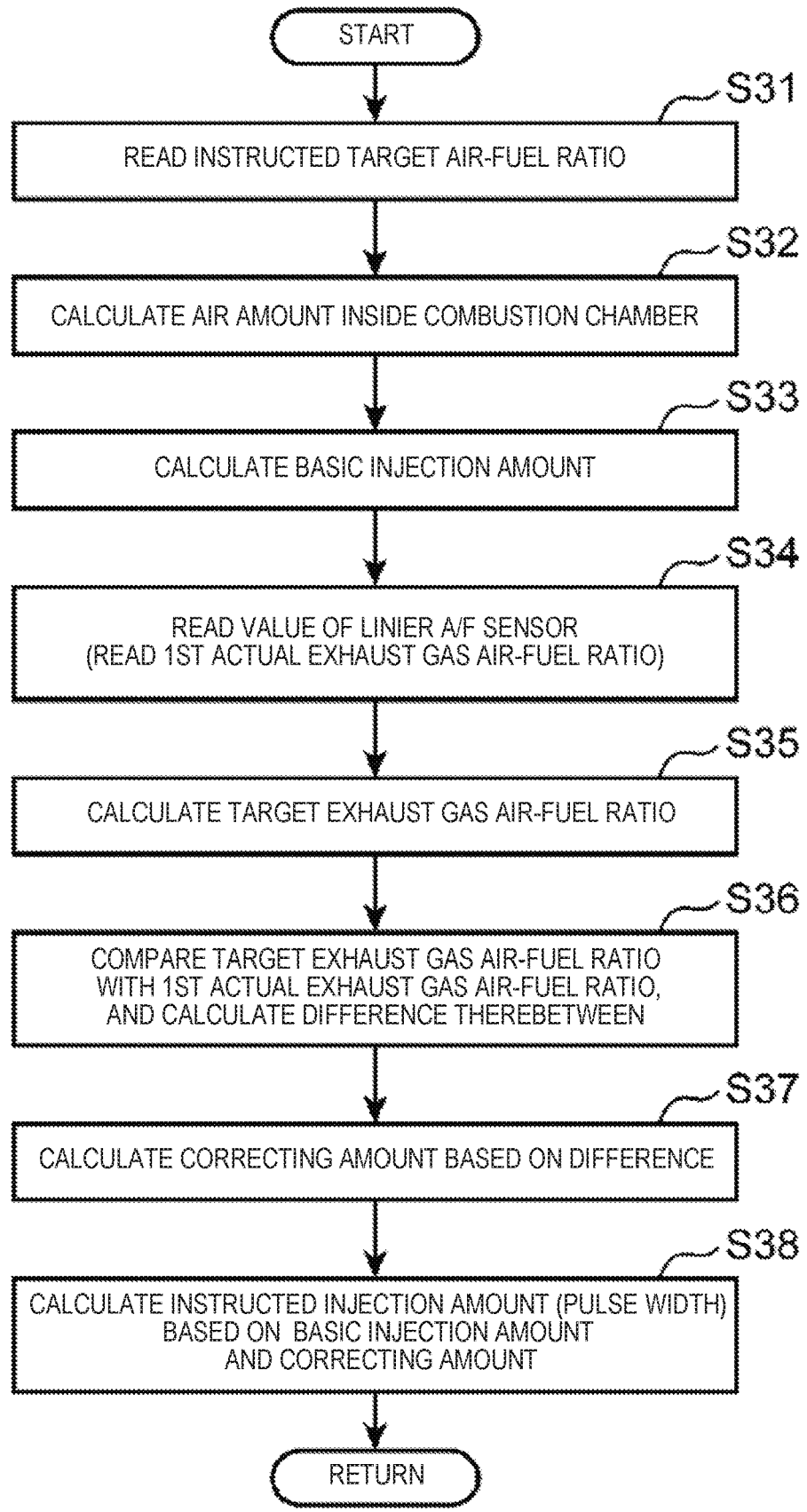
FIG. 11 is a flowchart illustrating a procedure of the correction of the air-fuel ratio.

If the controls of the air-fuel ratio are summarized, they become like flowcharts of FIGS. 9 to 11. FIGS. 9 and 10 illustrate a calculation procedure of an instructed target air-fuel ratio which is carried out by the basic target air-fuel ratio setting module 111 and the target air-fuel ratio correcting module 112. FIG. 11 illustrates a control procedure for achieving the instructed target air-fuel ratio which is carried out by the air-fuel ratio correcting module 113, i.e., a procedure of the correction of the air-fuel ratio of the combustion chamber. Note that in this embodiment, the flowcharts of FIGS. 9 to 11 are carried out only when the engine is operated in the first operating range A1 or the second operating range A2.

In the flowchart of FIG. 9, the ECU 100 first sets the basic target air-fuel ratio at Step S11. As described above, when the engine is operated in the second operating range A2, the basic target air-fuel ratio is set as the stoichiometric air-fuel ratio, and when the engine is operated in the first operating range A1, the basic target air-fuel ratio is set as a preset value which is higher than the stoichiometric air-fuel ratio.

Next, at Step S12, the ECU 100 determines whether the basic target air-fuel ratio is the stoichiometric air-fuel ratio. That is, the ECU 100 determines whether the engine is operated in the first operating range A1 or the second operating range A2.

If the determination at Step S12 is YES and the basic target air-fuel ratio is set as the stoichiometric air-fuel ratio (i.e., if the engine is operated in the second operating range A2), the ECU 100 shifts to Step S13. At Step S13, the ECU 100 reads the detection value of the $\lambda O_2$ sensor SN12, i.e., the second actual exhaust gas air-fuel ratio. Next, at Step S14, the ECU 100 compares the second actual exhaust gas air-fuel ratio with the stoichiometric air-fuel ratio and calculates a difference therebetween. Next, at Step S15, the ECU 100 calculates the correcting amount of the basic target air-fuel ratio based on the comparison result and the difference of the second actual exhaust gas air-fuel ratio and the stoichiometric air-fuel ratio read at Step S14. Then, at Step S16, the ECU 100 corrects the basic target air-fuel ratio set at Step S1 (the basic target air-fuel ratio=the stoichiometric air-fuel ratio at Step S16 after Step S15) by the correcting amount calculated at Step S15, and sets the corrected air-fuel ratio as the instructed target air-fuel ratio.

On the other hand, if the determination at Step S12 is NO and the basic target air-fuel ratio is not the stoichiometric air-fuel ratio (i.e., if the basic target air-fuel ratio is higher than the stoichiometric air-fuel ratio and the engine is operated in the first operating range A1), the ECU 100 shifts to Step S17. At Step S17, the ECU 100 reads the detection value of the $NO_x$ sensor SN13. That is, the ECU 100 reads the actual $NO_x$ concentration which is the $NO_x$ concentration of exhaust gas detected by the $NO_x$ sensor SN13. Next, at Step S18, the ECU 100 sets the target $NO_x$ concentration which is a target value of the $NO_x$ concentration of exhaust gas.

Next, at Step S19, the ECU 100 determines whether a condition that the ignition timing is corrected to the retarding side of the basic ignition timing, and the actual $NO_x$ concentration read at Step S17 is lower than the target $NO_x$ concentration set at Step S18 is satisfied. Note that the determination of whether the ignition timing is corrected to the retarding side of the basic ignition timing is performed based on the correcting amount of the ignition timing calculated at Step S6 in the flowchart of FIG. 6.

If the determination at Step S19 is YES, the ignition timing is corrected to the retarding side of the basic ignition timing, and the actual $NO_x$ concentration is lower than the target $NO_x$ concentration, the ECU 100 shifts to Step S20. At Step S20, the ECU 100 maintains the correcting amount of the air-fuel ratio inside the combustion chamber 6 at the correcting amount calculated last time. After Step S20, the ECU 100 shifts to Step S16 in FIG. 9. Then, at Step S16, the ECU 100 corrects the basic target air-fuel ratio set at Step S1 (the basic target air-fuel ratio is higher than the stoichiometric air-fuel ratio at Step S16 after Step S20) by the correcting amount of the air-fuel ratio set at Step S20, and sets the corrected air-fuel ratio as the instructed target air-fuel ratio. Here, at Step S20, the correcting amount of the air-fuel ratio is maintained at the correcting amount calculated last time. Therefore, at Step S16 after Step S20, the instructed target air-fuel ratio is maintained at the last instructed target air-fuel ratio, and the correction of the air-fuel ratio is suspended.

On the other hand, if the determination at Step S19 is NO, the ECU 100 shifts to Step S21. At Step S21, the ECU 100 determines whether a condition that the ignition timing is corrected to the advancing side of the basic ignition timing and the actual $NO_x$ concentration is higher than the target $NO_x$ concentration is satisfied. Note that the determination of whether the ignition timing is corrected to the advancing side of the basic ignition timing is performed based on the correcting amount of the ignition timing calculated at Step S6 in the flowchart of FIG. 6.

If the determination at Step S21 is YES, the ignition timing is corrected to the advancing side of the basic ignition timing, and the actual $NO_x$ concentration is higher than the target $NO_x$ concentration, the ECU 100 shifts to Step S20. As described above, at Step S20, the ECU 100 maintains the correcting amount of the air-fuel ratio at the correcting amount calculated last time, and then shifts to Step S16.

Then, at Step S16, the ECU 100 maintains the basic target air-fuel ratio set at Step S1 (at Step S16 after Step S21, the basic target air-fuel ratio is higher than the stoichiometric air-fuel ratio) at the correcting amount calculated most recently. Thus, also if the determination at Step S21 is YES, the instructed target air-fuel ratio is maintained at the last instructed target air-fuel ratio, and the correction of the air-fuel ratio is suspended.

On the other hand, if the determination at Step S21 is NO, the ECU 100 shifts to Step S22. That is, if the ignition timing is set at the basic ignition timing, or if the ignition timing is retarded from the basic ignition timing and the actual $NO_x$ concentration is higher than the target $NO_x$ concentration, the ECU 100 carries out Step S22. Moreover, if the ignition timing is advanced from the basic ignition timing and the actual $NO_x$ concentration is lower than the target $NO_x$ concentration, the ECU 100 carries out Step S22.

At Step S22, the ECU 100 compares the actual $NO_x$ concentration with the target $NO_x$ concentration, and calculates a difference therebetween. Next, at Step S23, the ECU 100 calculates the correcting amount of the basic target air-fuel ratio based on the comparison result and the difference of the actual $NO_x$ concentration and the target $NO_x$ concentration at Step S22, and updates the correcting amount. Then, the ECU 100 shifts to Step S16. Then, at Step S16, the ECU 100 corrects the basic target air-fuel ratio set at Step S1 (the basic target air-fuel ratio is higher than the stoichiometric air-fuel ratio at Step S16 after Step S23) by the correcting amount calculated at Step S23, and sets the corrected air-fuel ratio as the instructed target air-fuel ratio.

In the flowchart of FIG. 11, at Step S31, the ECU 100 first reads the instructed target air-fuel ratio calculated as described above. Next, at Step S32, the ECU 100 estimates an amount of air inside the combustion chamber 6 based on, for example, the flow rate of the intake air detected by the airflow sensor SN3. Next, at Step S33, the ECU 100 calculates an amount of fuel at which the air-fuel ratio becomes the instructed target air-fuel ratio with the estimated amount of air inside the combustion chamber 6 based on the estimated amount of air inside the combustion chamber 6 and the instructed target air-fuel ratio read at Step S31, as the basic injection amount. Next, at Step S34, the ECU 100 reads the detection value of the linear A/F sensor SN11, i.e., the first actual exhaust gas air-fuel ratio. Next, at Step S35, the ECU 100 calculates the target exhaust gas air-fuel ratio which is an air-fuel ratio of the exhaust gas (an air-fuel ratio of exhaust gas at the position of the linear A/F sensor SN11) corresponding to the instructed target air-fuel ratio. Next, at Step S36, the ECU 100 compares the target exhaust gas air-fuel ratio calculated at Step S35 with the first actual exhaust gas air-fuel ratio, and calculates a difference therebetween. Next, at Step S37, the ECU 100 calculates the correcting amount of the injection amount based on the comparison result and the difference of the target exhaust gas air-fuel ratio and the first actual exhaust gas air-fuel ratio at Step S36. Next, at Step S38, the ECU 100 corrects the basic injection amount calculated at Step S33 by the correcting amount calculated at Step S37, and sets it as the final injection amount. After that, the ECU 100 issues an instruction to the injector 15 so as to inject fuel by an injection pulse corresponding to this final injection amount.

(6) Operations, etc.

Figure 12:
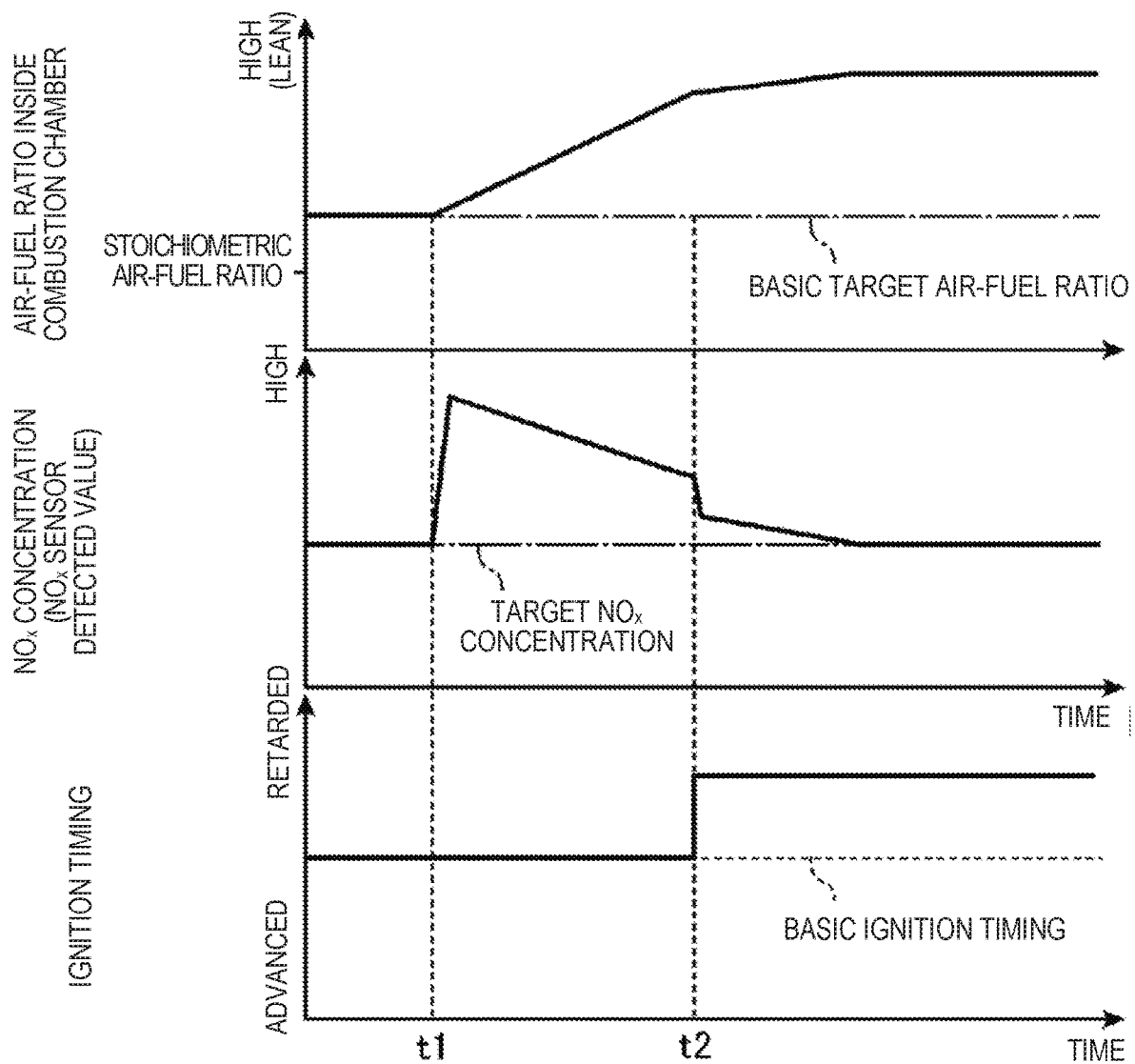
FIG. 12 is a time chart according to a comparative example illustrating operations and effects of this embodiment.
Figure 13:
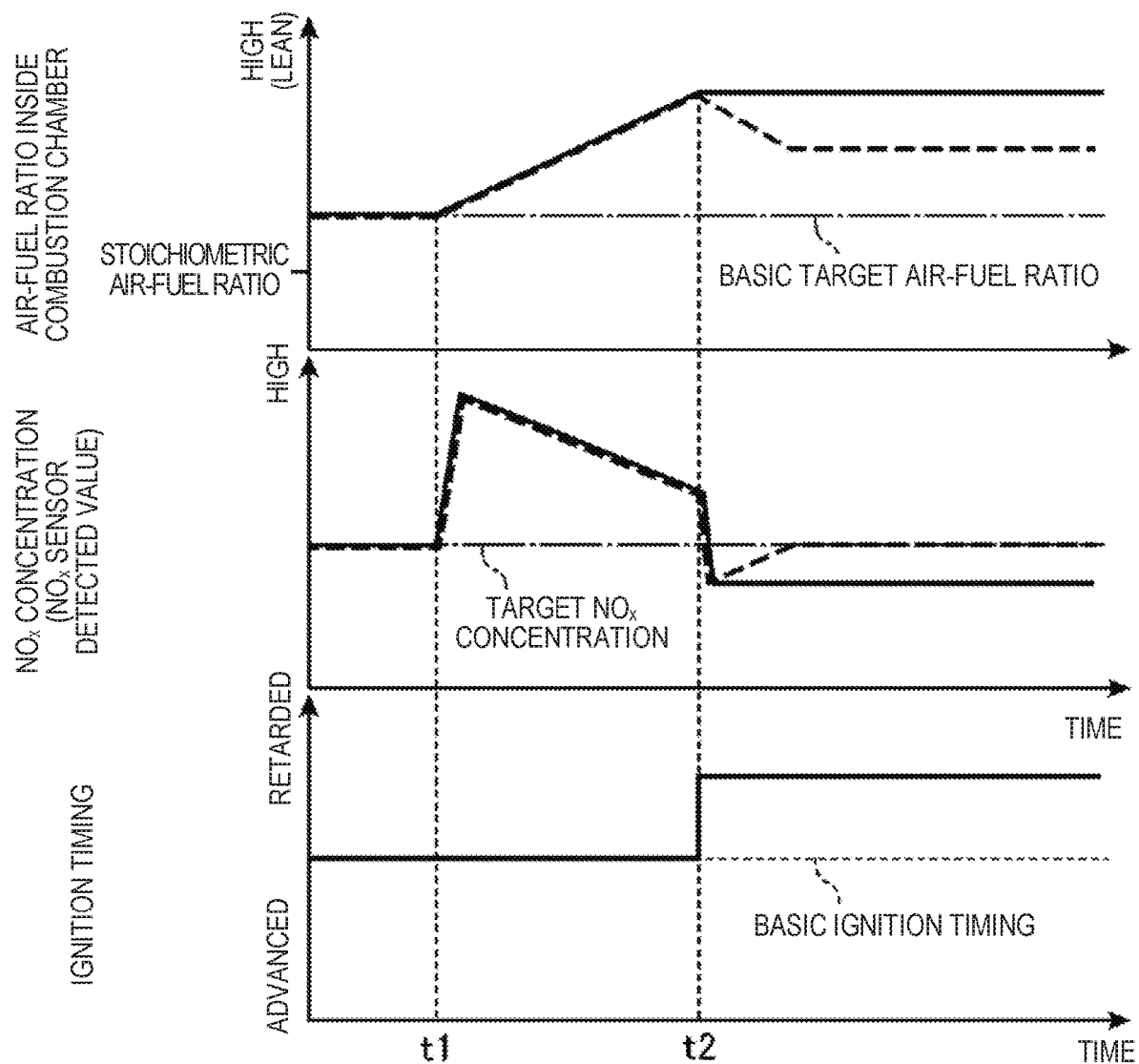
FIG. 13 is a time chart illustrating operations and effects of this embodiment.
Figure 14:
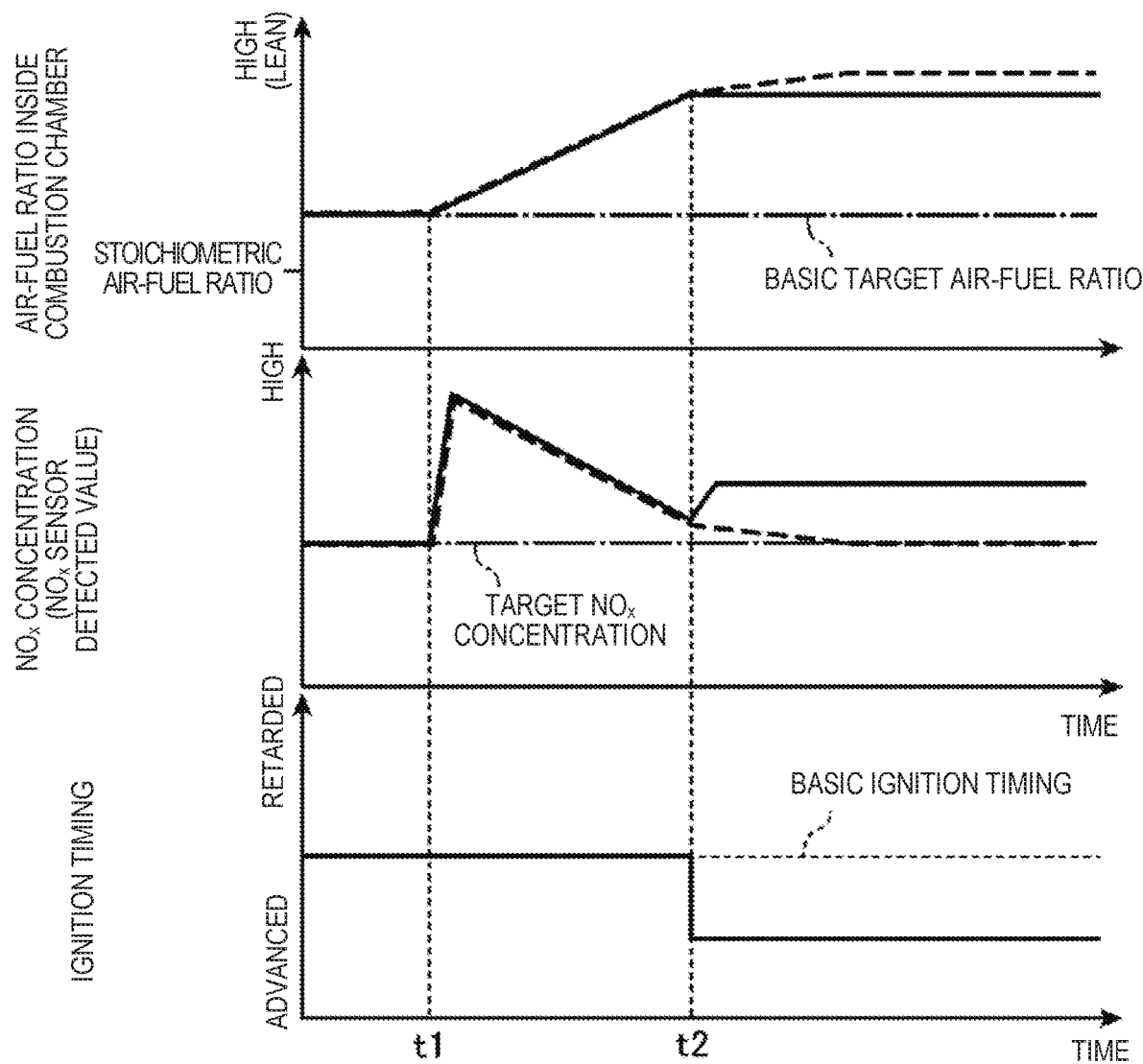
FIG. 14 is a time chart illustrating operations and effects of this embodiment.

FIGS. 12 to 14 schematically illustrate a time change of each parameter when the target air-fuel ratio is corrected in the first operating range A1. In FIGS. 12 to 14, the air-fuel ratio inside the combustion chamber 6, the $NO_x$ concentration (the $NO_x$ concentration of exhaust gas detected by the $NO_x$ sensor SN13), and the ignition timing are illustrated in this order from the top.

As illustrated in FIG. 12, when the actual $NO_x$ concentration which is the $NO_x$ concentration of exhaust gas detected by the $NO_x$ sensor SN13 at a time t1 exceeds the target $NO_x$ concentration, the air-fuel ratio inside the combustion chamber 6 is made higher than the basic target air-fuel ratio. In connection with this, the $NO_x$ concentration decreases toward the target $NO_x$ concentration. Then, when the ignition timing is retarded from the basic ignition timing at a time t2, the $NO_x$ concentration decreases further, in connection with the retard of the ignition timing. However, like the example illustrated in FIG. 12, in connection with the retard of the ignition timing, when the $NO_x$ concentration is still higher than the target $NO_x$ concentration, the air-fuel ratio inside the combustion chamber 6 is made even higher, and thereby, the actual $NO_x$ concentration converges with the target $NO_x$ concentration.

On the other hand, as illustrated in FIG. 13, similarly to the example illustrated in FIG. 12, while the air-fuel ratio inside the combustion chamber 6 being made higher than the basic target air-fuel ratio with the actual $NO_x$ concentration exceeding the target $NO_x$ concentration at the time t1, when the ignition timing is retarded from the basic ignition timing at the time t2, the correction of the air-fuel ratio inside the combustion chamber 6 is suspended as illustrated by a solid line, if the actual $NO_x$ concentration falls below the target $NO_x$ concentration by retarding the ignition timing. That is, at the time t2, the control to reduce the air-fuel ratio inside the combustion chamber 6 is not carried out in order to make the actual $NO_x$ concentration to the target $NO_x$ concentration as illustrated by the broken line, and the air-fuel ratio inside the combustion chamber 6 is maintained at the value immediately before the ignition timing is retarded.

Moreover, as illustrated in FIG. 14, while the air-fuel ratio inside the combustion chamber 6 being made higher than the basic target air-fuel ratio with the actual $NO_x$ concentration exceeding the target $NO_x$ concentration at the time t1, when the ignition timing is advanced from the basic ignition timing at the time t2, the correction of the air-fuel ratio inside the combustion chamber 6 is suspended as illustrated by the solid line, also if the actual $NO_x$ concentration is still higher than the target $NO_x$ concentration. That is, at the time t2, the control to further increase the air-fuel ratio inside the combustion chamber 6 in order to make the actual $NO_x$ concentration to the target $NO_x$ concentration as illustrated by the broken line is not carried out, and the air-fuel ratio inside the combustion chamber 6 is maintained at the value immediately before the ignition timing is advanced.

As described above, according to this embodiment, in the first operating range A1, the air-fuel ratio inside the combustion chamber 6 is changed based on the actual $NO_x$ concentration which is the $NO_x$ concentration actually detected by the $NO_x$ sensor SN13. Therefore, the amount of $NO_x$ discharged from the engine can be made the suitable amount by making the air-fuel ratio inside the combustion chamber 6 to the air-fuel ratio at which the $NO_x$ concentration of exhaust gas becomes the desired concentration.

Moreover, when combustion noise increases (or may increase), the ignition timing is corrected to the retarding side of the basic ignition timing. Therefore, the increase in combustion noise can be prevented by slowing down the combustion of the mixture gas inside the combustion chamber 6. Moreover, when the combustion stability degrades (or may degrade), the ignition timing is corrected to the advancing side of the basic ignition timing. Therefore, the combustion of the mixture gas inside the combustion chamber 6 can be stimulated to stabilize the combustion. That is, the ignition timing is corrected based on the combustion state of the mixture gas inside the combustion chamber 6. Therefore, the worsening of combustion noise and the destabilization of the combustion can be prevented by making the combustion state of the mixture gas to the suitable combustion state.

Particularly, in this embodiment, the combustion center-of-gravity timing is corrected based on the parameters related to the temperature, the pressure, the gas flow inside the combustion chambers 6, such as the EGR rate, the engine water temperature, the in-cylinder pressure, the valve timings of the intake valve 11 and the exhaust valve 12, and the opening of the swirl valve 18, i.e., the parameters which influence the combustion state inside the combustion chamber 6, and the target combustion center-of-gravity timing is set. The ignition timing is corrected according to the difference between the target combustion center-of-gravity timing and the actual combustion center-of-gravity timing. Therefore, the combustion center-of-gravity timing can be at the suitable timing according to the temperature, pressure, and gas flow inside the combustion chamber 6, and therefore, the degradation of the combustion noise and the degradation of the combustion stability can be prevented more securely.

However, as described above, if the control of the air-fuel ratio inside the combustion chamber 6 based on the $NO_x$ concentration and the control of the ignition timing are both carried out simply, there is a possibility that neither the degradation of combustion noise nor the degradation of combustion stability can be prevented appropriately.

In detail, when the ignition timing is corrected to the retarding side of the basic ignition timing and the air-fuel ratio inside the combustion chamber 6 is corrected to the lower side based on the actual $NO_x$ concentration, there is a possibility that the degradation of combustion noise cannot fully be prevented. Moreover, in this case, there is a possibility that fuel efficiency may degrade by the air-fuel ratio being corrected to the lower side. On the other hand, in this embodiment, when correcting the ignition timing to the retarding side of the basic ignition timing, the control of the air-fuel ratio based on the actual $NO_x$ concentration is suspended. Therefore, the degradation of combustion noise can be prevented securely, and fuel efficiency can be improved. Moreover, at this time, since the actual $NO_x$ concentration is lower than the target $NO_x$ concentration, the discharging amount of $NO_x$ can also be kept small.

Moreover, when the ignition timing is corrected to the advancing side of the basic ignition timing and the air-fuel ratio inside the combustion chamber 6 is corrected to the higher side based on the actual $NO_x$ concentration, there is a possibility that the degradation of combustion stability cannot fully be prevented. On the other hand, in this embodiment, when correcting the ignition timing to the advancing side of the basic ignition timing, the control of the air-fuel ratio based on the actual $NO_x$ concentration is suspended. Therefore, the degradation of combustion stability can be prevented securely.

Particularly, in the first operating range A1, SPCCI combustion in which the sensitivities (rates of change) of the combustion noise and the combustion stability to the ignition timing and the air-fuel ratio inside the combustion chamber 6 is carried out. By this control being carried out in the first operating range A1, the suitable SPCCI combustion with the appropriate combustion noise and combustion stability can be achieved. Moreover, the achievement of the suitable SPCCI combustion can securely improve fuel efficiency.

(8) Modifications

Although in the above embodiment the detection value of the $NO_x$ sensor SN13 is directly compared with the target $NO_x$ concentration, and the target air-fuel ratio is corrected based on the comparison result, the $NO_x$ concentration of exhaust gas may be estimated using a model calculation, the detection value of the $NO_x$ sensor SN13 may be used for learning the error of the estimated value of the $NO_x$ concentration (a so-called model error), and the target air-fuel ratio may be corrected based on a difference between the estimated value of the $NO_x$ concentration after being corrected based on the detection value of the $NO_x$ sensor SN13, and the target $NO_x$ concentration.

In the above embodiment, the air-fuel ratio inside the combustion chamber 6 is corrected using the detection value of the $NO_x$ sensor SN13 in the first operating range A1 where SPCCI combustion is performed while the air-fuel ratio inside the combustion chamber 6 being made higher than the stoichiometric air-fuel ratio, and the ignition timing is corrected according to the combustion state. However, these correction controls may be applied to combustion other than SPCCI combustion.

Moreover, in the above embodiment, the target combustion center-of-gravity timing is set based on the parameter according to the combustion state, and the ignition timing is corrected so that the target combustion center-of-gravity timing is achieved. However, the ignition timing may be corrected based on parameters other than the combustion center-of-gravity timing. For example, instead of the combustion center-of-gravity timing, a timing θci at which CI combustion starts, and a timing at which combustion starts may be used, and the ignition timing may be corrected so that the timing θci and the combustion start timing become given values. Alternatively, target values of the timing θci and the timing at which combustion starts may be set based on the parameter according to the combustion state, and the ignition timing may be corrected so that the target values are achieved. Alternatively, the ignition timing may be corrected, for example, using dP/dθ (a pressure fluctuation inside the combustion chamber 6) which highly correlates with combustion noise, and the total calorific value (a total amount of calorific power generated inside the combustion chamber 6 during one combustion cycle) which highly correlates with combustion stability.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine Body
2 Cylinder
6 Combustion Chamber
15 Injector
16 Ignition Plug
41a Three-way Catalyst
100 ECU (Controller)
SN11 Linear A/F Sensor
SN12 $\lambda O_2$ Sensor
SN13 $NO_x$ Sensor

What is claimed is:

1. A control device for an engine provided with an engine body where a cylinder is formed, and an exhaust passage through which exhaust gas discharged from the engine body circulates, the control device comprising:
  an ignition plug configured to ignite a mixture gas inside the cylinder;
  an injector configured to change an air-fuel ratio inside the cylinder;
  a $NO_x$ sensor disposed in the exhaust passage and configured to detect a concentration of $NO_x$ in the exhaust gas; and
  a controller including a processor configured to control the ignition plug and the injector, the controller performing:
    a first control in which the ignition plug is controlled so that ignition is performed at one of a preset basic ignition timing, and an ignition timing after the basic ignition timing is corrected based on a combustion state of the mixture gas inside the cylinder; and
    a second control in which the injector is controlled so that the $NO_x$ concentration detected by the $NO_x$ sensor approaches a given target value,
  wherein when the ignition timing is corrected by the first control to a retarding side of the basic ignition timing, the controller suspends a correction of the air-fuel ratio inside the cylinder to a richer side even if the $NO_x$ concentration detected by the $NO_x$ sensor is a concentration at which the correction of the air-fuel ratio to the richer side is performed by the second control.

2. The control device of claim 1, wherein when the ignition timing is corrected to an advancing side of the basic ignition timing by the first control, the controller suspends a correction of the air-fuel ratio inside the cylinder to a leaner side even if the $NO_x$ concentration detected by the $NO_x$ sensor is a concentration at which the correction of the air-fuel ratio to the leaner side is performed by the second control.

3. The control device of claim 1, wherein when the controller suspends the correction of the air-fuel ratio inside the cylinder to the richer side, the controller maintains the air-fuel ratio at a most recent target air-fuel ratio.

4. The control device of claim 1, wherein the controller performs partial compression ignition combustion in which spark ignition (SI) combustion of a portion of the mixture gas inside the cylinder is forcibly carried out by jump-spark ignition and compression ignition (CI) combustion of the remaining mixture gas inside the cylinder is then carried out by self-ignition, and performs the second control in at least a part of an operating range where the partial compression ignition combustion is performed.

5. The control device of claim 4, comprising an in-cylinder pressure sensor configured to detect an in-cylinder pressure inside a combustion chamber of the engine,
  wherein the basic ignition timing is set based on an operating state of the engine,
  wherein a combustion center-of-gravity timing that is a timing at which a heat generation of 50% of the total amount of a calorific power inside the cylinder occurs is set as a target combustion center-of-gravity timing,
  wherein a rate of heat release is calculated based on the in-cylinder pressure detected by the in-cylinder pressure sensor,
  wherein the total amount of heat release per one combustion cycle is calculated by integrating the calculated rates of heat release for one combustion cycle,
  wherein the timing at which an amount of heat release reaches 50% of the calculated total amount of heat release is calculated as an actual combustion center-of-gravity timing, wherein the basic ignition timing is corrected based on a difference between the target combustion center-of-gravity timing and the actual combustion center-of-gravity timing, and wherein the target combustion center-of-gravity timing is corrected to a retarding side when combustion noise increases.

6. The control device of claim 5, wherein the target combustion center-of-gravity timing is corrected to the retarding side when an exhaust gas recirculation (EGR) rate is higher than a preset value.

7. The control device of claim 5, wherein the target combustion center-of-gravity timing is corrected to the retarding side when a water temperature of the engine is higher than a preset value.

8. The control device of claim 5, wherein the target combustion center-of-gravity timing is corrected to the retarding side when the in-cylinder pressure is higher than a preset value.

9. The control device of claim 1, wherein the controller controls the injector to increase an amount of change in the air-fuel ratio inside the cylinder as the difference between the $NO_x$ concentration detected by the $NO_x$ sensor and the target value becomes larger.

10. A method of controlling an engine, comprising the steps of:

performing a first control in which ignition is performed at one of a preset basic ignition timing, and an ignition timing after the basic ignition timing is corrected based on a combustion state of a mixture gas inside a cylinder formed in an engine body of the engine;

performing a second control in which a concentration of $NO_x$ approaches a given target value; and when the ignition timing is corrected by the first control to a retarding side of the basic ignition timing, suspending a correction of the air-fuel ratio inside the cylinder to a richer side even if the $NO_x$ concentration is a concentration at which the correction of the air-fuel ratio to the richer side is performed by the second control.

* * * * *